(12) United States Patent
Li et al.

(10) Patent No.: US 11,570,093 B2
(45) Date of Patent: Jan. 31, 2023

(54) DATA TRANSMISSION METHOD, NODE AND SYSTEM

(71) Applicant: Huawei Technologies Co., Ltd., Shenzhen (CN)

(72) Inventors: Taixin Li, Shenzhen (CN); Jiayao Tan, Beijing (CN); Zongxin Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 16/928,899

(22) Filed: Jul. 14, 2020

(65) Prior Publication Data

US 2020/0344161 A1 Oct. 29, 2020

Related U.S. Application Data

(63) Continuation of application No. PCT/CN2020/074260, filed on Feb. 4, 2020.

(30) Foreign Application Priority Data

Feb. 21, 2019 (CN) .......................... 201910129842.X

(51) Int. Cl.
*G06F 15/16* (2006.01)
*H04L 45/50* (2022.01)
(Continued)

(52) U.S. Cl.
CPC ............ *H04L 45/507* (2013.01); *H04L 45/20* (2013.01); *H04L 45/74* (2013.01)

(58) Field of Classification Search
CPC ......... H04L 45/02; H04L 45/16; H04L 45/00; H04L 12/18; H04L 45/507; H04L 45/20; H04L 45/74
(Continued)

(56) References Cited

U.S. PATENT DOCUMENTS 10,476,788 B1 * 11/2019 Morris ................ H04L 61/1511
10,587,505 B1 * 3/2020 Morris .................... H04L 45/02
(Continued)

FOREIGN PATENT DOCUMENTS

CA       2282038 A1 *  3/2000  ......... H04Q 11/0478
CN    103905307 A      7/2014
(Continued)

OTHER PUBLICATIONS

Improvement of Data Distribution in LGossiping with Choosing the Next Hop According to Its Chance Hamid Reza Afrancheh;Mehdi Dabbaghian;Mohammad H. Khodashahi;Fatemeh Amiri 2010 6th International Conference on Wireless and Mobile Communications Year: 2010 | Conference Paper | Publisher: IEEE (Year: 2010).*
(Continued)

*Primary Examiner* — Oscar A Louie
*Assistant Examiner* — Oluwatosin M Gidado
(74) *Attorney, Agent, or Firm* — Slater Matsil, LLP

(57) ABSTRACT

A data transmission method, a node, and a system, the method including receiving, by a forwarding node, a data packet, where a label stack of the data packet comprises a path identifier (path-ID), where the path-ID is an identifier of a constrained path, and where the constrained path is a path that consists of at least two nodes arranged in a specific order, determining, by the forwarding node, that the forwarding node is a node on the constrained path, selecting, by the forwarding node, a target label/target address from a local available label block/address block according to the path-ID and according to a preset rule, where the label block/address block comprises at least one label/address, searching for, by the forwarding node, a corresponding target interface according to the target label/target address, and forwarding, by the forwarding node, the data packet through the target interface.

20 Claims, 19 Drawing Sheets

(51) Int. Cl.
H04L 45/00 (2022.01)
H04L 45/74 (2022.01)

(58) Field of Classification Search
USPC .......................................................... 709/223
See application file for complete search history.

(56) References Cited

U.S. PATENT DOCUMENTS

| | | |
|---|---|---|
| 2002/0110119 A1 | 8/2002 | Fredette et al. |
| 2007/0104194 A1* | 5/2007 | Wijnands .............. H04L 12/185 370/390 |
| 2009/0135816 A1* | 5/2009 | Nandagopal ........ H04L 61/2007 370/389 |
| 2014/0341222 A1 | 11/2014 | Filsfils et al. |
| 2015/0207724 A1 | 7/2015 | Choudhury et al. |
| 2016/0301608 A1* | 10/2016 | Natarajan ........... H04L 12/2865 |
| 2017/0244631 A1 | 8/2017 | Guichard et al. |
| 2018/0026874 A1 | 1/2018 | Usman et al. |
| 2018/0146413 A1* | 5/2018 | Wetterwald ............. H04L 45/34 |
| 2018/0287935 A1* | 10/2018 | Wang .................. H04L 12/4625 |

FOREIGN PATENT DOCUMENTS

| | | | | |
|---|---|---|---|---|
| CN | 105634942 A | 6/2016 | | |
| CN | 105871722 A | 8/2016 | | |
| CN | 105991437 A | 10/2016 | | |
| CN | 108156077 A | 6/2018 | | |
| CN | 109361600 A | 2/2019 | | |
| EP | E P-2882149 A1 * | 6/2015 | ............. | H04L 43/10 |
| EP | 3249865 A1 | 11/2017 | | |
| JP | 2003179631 A | 6/2003 | | |
| WO | WO-2016019866 A1 * | 2/2016 | ......... | H04L 12/4633 |
| WO | 2016131225 A1 | 8/2016 | | |
| WO | 2016198015 A1 | 12/2016 | | |
| WO | 2017193733 A1 | 11/2017 | | |

OTHER PUBLICATIONS

A new method for encoding MPLS segment routing TE paths Rabah Guedrez; Olivier Dugeon;Samer Lahoud;Géraldine Texier 2017 8th International Conference on the Network of the Future (NOF) Year: 2017 | Conference Paper | Publisher: IEEE (Year: 2017).*

Achieving Fast and Lightweight SDN Updates with Segment Routing Long Luo;Hongfang Yu;Shouxi Luo; 2016 IEEE Global Communications Conference (GLOBECOM) Year: 2016 | Conference Paper | Publisher: IEEE (Year: 2016).*

Chunduri, U. et al., "Preferred Path Routing (PPR) in IS-IS, draft-chunduri-lsr-isis-preferred-path-routing-01," LSR Working Group, Jul. 2, 2018, 51 pages.

Chunduri, U. et al., "Preferred Path Routing (PPR) in OSPF, draft-chunduri-lsr-ospf-preferred-path-routing-01," LSR Working Group—Internet Draft, Standards Track, Jul. 2, 2018, 22 pages.

Chunduri, U. et al., "Resources for Preferred Path Routes in IGPs, draft-cls-ppr-te-attributes-00," LSR Working Group—Internet Draft, Standards Track, Jul. 16, 2018, 16 pages.

Filsfils, C. et al., "Segment Routing Architecture," Internet Engineering Task Force (IETF), Request for Comments: 8402, Category: Standards Track, ISSN: 2070-1721, RFC8402, Jul. 2008, 32 pages.

* cited by examiner

DATA TRANSMISSION METHOD, NODE AND SYSTEM

CROSS-REFERENCE TO RELATED APPLICATIONS

This application is a continuation of International Application No. PCT/CN2020/074260, filed on Feb. 4, 2020, which claims priority to Chinese Patent Application No. 201910129842.X, filed on Feb. 21, 2019. The disclosures of the aforementioned applications are hereby incorporated by reference in their entireties.

TECHNICAL FIELD

This application relates to the communications field, and in particular, to a data transmission method, a node, and a system.

BACKGROUND

Segment routing (SR) is a source routing technology, and is used to indicate a forwarding path for transmitting a data packet from a source node to a target node in a network. The source node may add a segment to the data packet in a specific order as an instruction for instructing to forward the data packet in the network. Such a segment is referred to as a segment identifier (SID). One SID is used to indicate one node, and a plurality of SIDs are arranged in a specific order to obtain a SID list. The SID list is encoded into a label stack of the data packet, so that when the data packet reaches a node, the node determines a next-hop node based on the SID list carried in the data packet, and sends the data packet to the next-hop node. However, if the data packet needs to pass through a large quantity of nodes, the SID list is excessively long, and a data amount of the label stack of the data packet is excessively large. Consequently, a proportion of load of the data packet is reduced, and transmission efficiency is low.

Currently, to resolve the foregoing problem, the source node may determine a multi-protocol label switching (MPLS) label for a constrained path, and notify each node on the constrained path in advance, so that the node on the constrained path predetermines the MPLS label and a corresponding interface. The corresponding interface is used to indicate a next-hop node on the constrained path. In this way, when sending a data packet, the source node may carry only the MPLS label, and does not need to carry a SID list of the entire constrained path. When a node on the constrained path receives the data packet, the node may search for a corresponding interface based on the predetermined MPLS label, and forward the data packet through the interface.

In the foregoing method, each node on a same constrained path needs to use an MPLS label. Because another service also uses an MPLS label, usage of MPLS labels of different nodes is different, and it cannot be ensured that different nodes have a same MPLS label. Even if all nodes have a same available MPLS label, the nodes need to negotiate with each other. It is not easy to execute the negotiation.

SUMMARY

Embodiments of this application provide a data transmission method, a node, and a system, to determine a target label/target address based on a path-ID in a received data packet, further determine a corresponding target interface, and forward the data packet through the target interface.

A first aspect of this application provides a data transmission method, including receiving, by a forwarding node, a data packet, where a label stack of the data packet includes a path identifier (path-ID), the path-ID is an identifier of a constrained path, and the constrained path is a path that consists of at least two nodes arranged in a specific order, determining, by the forwarding node, that the forwarding node is a node on the constrained path, selecting, by the forwarding node, a target label/target address from a local available label block/address block based on the path-ID and according to a preset rule, where the label block/address block includes at least one label/address, searching for, by the forwarding node, a corresponding target interface based on the target label/target address, and forwarding, by the forwarding node, the data packet through the target interface.

When the forwarding node receives the data packet, the forwarding node may determine the target label from the local available label block based on the path-ID in the label stack of the data packet and according to the preset rule, search for an outbound interface corresponding to the target label, and forward the data packet through the outbound interface. Therefore, in a network transmission process of the data packet, forwarding nodes are not required to have a same local available label. This avoids a case in which all the forwarding nodes do not have a common local available label.

In some possible implementations, the preset rule is selecting, as the target label, the $X^{th}$ label from the label block/address block in a preset order by using a value of the path-ID as an offset X. A same target label may be obtained through calculation based on a same path-ID and according to a same preset rule. Therefore, it is not required that all nodes use the same target label to represent the constrained path.

In some possible implementations, the preset order is an order of label/address values arranged in ascending order, and this provides higher feasibility and less execution difficulty.

In some possible implementations, before the receiving, by a forwarding node, a data packet, the method further includes receiving, by the forwarding node, a path information data packet, where the path information data packet includes the constrained path and the path-ID, determining, by the forwarding node, a next-hop node based on the constrained path, where the next-hop node is a next node of the forwarding node on the constrained path, determining, by the forwarding node, the target interface based on the next-hop node, selecting, by the forwarding node, the target label/target address from the label block/address block based on the path-ID and according to the preset rule, and storing, by the forwarding node, the target label/target address and the target interface in a corresponding manner.

For information about the constrained path, only information about the next-hop node is extracted to determine the target interface, and the target label/target address and the target interface are stored. Therefore, the information about the entire constrained path does not need to be stored, and this minimizes a storage requirement and also meets a characteristic that the forwarding node only forwards data but does not process data.

In some possible implementations, the label block is a multi-protocol label switching MPLS label block, and the storing, by the forwarding node, the target label/target address and the target interface in a corresponding manner includes storing, by the forwarding node, the target label and the target interface in a target entry of a label forwarding information base (LFIB) in a corresponding manner, where the target label is stored in an incoming label of the target entry, and the target interface is stored in an outbound interface of the target entry.

In some possible implementations, the determining, by the forwarding node, the target interface based on the next-hop node includes determining, by the forwarding node, that the next-hop node is not a neighbor node of the forwarding node, selecting, by the forwarding node, the target interface from an interface other than an interface through which the data packet is received, and storing, by the forwarding node, an identifier of the next-hop node in an outgoing label of the target entry, and before the forwarding, by the forwarding node, the data packet through the target interface, the method further includes pushing, by the forwarding node, the identifier of the next-hop node into the label stack of the data packet.

In the foregoing storage manner, a data storage manner in which an MPLS technology for forwarding is used, so that an existing MPLS protocol is maximally used, with a minimum change made to the protocol.

In some possible implementations, the determining, by the forwarding node, the target interface based on the next-hop node includes determining, by the forwarding node, that the next-hop node is a neighbor node of the forwarding node, determining, by the forwarding node, an interface corresponding to the next-hop node as the target interface, and storing, by the forwarding node, the path-ID in an outgoing label of the target entry.

When forwarding the data packet, the forwarding node may replace a label at the top of a stack of the data packet with the path-ID in the outgoing label. Because the label at the top of the stack of the data packet is also a path-ID, it is equivalent to keeping a same path-ID in the data packet for forwarding. In this way, a next forwarding node that receives the data packet may perform, based on the same path-ID, a same operation as that performed by a previous forwarding node.

In some possible implementations, the address block is an IP address block, and the storing, by the forwarding node, the target label/target address and the target interface in a corresponding manner includes storing, by the forwarding node, the target address and the target interface in a target entry of a forwarding information base (FIB) in a corresponding manner, where the target label is stored in an address of the target entry, and the target interface is stored in an interface of the target entry.

In the foregoing storage manner, a data storage manner in which an internet protocol version 6 (IPv6) technology for forwarding is used, so that an existing IPv6 protocol is maximally used, with a minimum change made to the protocol.

In some possible implementations, the determining, by the forwarding node, the target interface based on the next-hop node includes determining, by the forwarding node, that the next-hop node is a neighbor node of the forwarding node, and determining, by the forwarding node, an interface corresponding to the next-hop node as the target interface.

For information about the constrained path, only information about the next-hop node is extracted to determine the target interface, and the target address and the target interface are stored. Therefore, the information about the entire constrained path does not need to be stored, and this minimizes a storage requirement and also meets a characteristic that the forwarding node only forwards data but does not process data.

In some possible implementations, the determining, by the forwarding node, the target interface based on the next-hop node includes determining, by the forwarding node, that the next-hop node is not a neighbor node of the forwarding node, selecting, by the forwarding node, the target interface from an interface other than an interface through which the data packet is received, and storing, by the forwarding node, an address of the next-hop node in the address of the target entry. In the foregoing storage manner, a data storage manner in which an IPv6 technology for forwarding is used, so that an existing IPv6 protocol is maximally used, with a minimum change made to the protocol.

A second aspect of this application provides a data transmission method, including receiving, by a source node, a data packet, determining, by the source node, a target node based on a destination IP address of the data packet, determining, by the source node, a path-ID and a corresponding next-hop node based on the target node, where the path-ID is an identifier of a constrained path, the constrained path is a path that consists of at least two nodes arranged in a specific order, the next-hop node is a next node of the source node on the constrained path, and the target node is a last node on the constrained path, pushing, by the source node, the path-ID into a label stack of the data packet, and sending, by the source node, the data packet to the next-hop node.

When the forwarding node receives the data packet, the forwarding node may determine a target address from a local available address block based on the path-ID in the label stack of the data packet and according to a preset rule, search for an outbound interface corresponding to the target address, and forward the data packet through the outbound interface. Therefore, in a network transmission process of the data packet, forwarding nodes are not required to have a same local available address. This avoids a case in which all the forwarding nodes do not have a common local available label.

In some possible implementations, before the source node determines the next-hop node and a corresponding path-ID based on the target node of the data packet, the method further includes receiving, by the source node, a path information data packet, where the path information data packet includes the constrained path and the path-ID, determining, by the source node, the next-hop node and the target node based on the constrained path, determining, by the source node, the target customer edge (CE) based on the target node, and storing, by the source node, the target CE, the next-hop node, and the path-ID in a corresponding manner.

For information about the constrained path, only information about the next-hop node is extracted to determine the target interface, and the target label/target address and the target interface are stored. Therefore, the information about the entire constrained path does not need to be stored, and this minimizes a storage requirement and also meets a characteristic that the forwarding node only forwards data but does not process data.

A third aspect of this application provides a data transmission method, including a transceiver, a memory, and a processor, where the processor is configured to execute a computer-readable instruction in the memory, to perform the following operations receiving a data packet, where a label stack of the data packet includes a path identifier path-ID, the path-ID is an identifier of a constrained path, and the constrained path is a path that consists of at least two nodes arranged in a specific order, determining that the forwarding node is a node on the constrained path, selecting a target label/target address from a local available label block/address block based on the path-ID and according to a preset rule, where the label block/address block includes at least one label/address, searching for a corresponding target interface based on the target label/target address, and forwarding the data packet through the target interface.

When the forwarding node receives the data packet, the forwarding node may determine the target label/target address from the local available label block/address block based on the path-ID in the label stack of the data packet and according to the preset rule, search for an outbound interface corresponding to the target label/target address, and forward the data packet through the outbound interface. Therefore, in a network transmission process of the data packet, forwarding nodes are not required to have a same local available label. This avoids a case in which all the forwarding nodes do not have a common local available label.

In some possible implementations, the preset rule is selecting, as the target label/target address, the $X^{th}$ label/address from the label block/address block in a preset order by using a value of the path-ID as an offset X. For information about the constrained path, only information about the next-hop node is extracted to determine the target interface, and the target label/target address and the target interface are stored. Therefore, the information about the entire constrained path does not need to be stored, and this minimizes a storage requirement and also meets a characteristic that the forwarding node only forwards data but does not process data.

In some possible implementations, the preset order is an order of label/address values arranged in ascending order, and this provides higher feasibility and less execution difficulty.

In some possible implementations, the processor is further configured to receive a path information data packet, where the path information data packet includes the constrained path and the path-ID, determine a next-hop node based on the constrained path, where the next-hop node is a next node of the forwarding node on the constrained path, determine the target interface based on the next-hop node, select the target label/target address from the label block/address block based on the path-ID and according to the preset rule, and store the target label/target address and the target interface in a corresponding manner.

For information about the constrained path, only information about the next-hop node is extracted to determine the target interface, and the target label/target address and the target interface are stored. Therefore, the information about the entire constrained path does not need to be stored, and this minimizes a storage requirement and also meets a characteristic that the forwarding node only forwards data but does not process data.

In some possible implementations, the label block is a multi-protocol label switching MPLS label block, and the storing the target label/target address and the target interface in a corresponding manner includes storing the target label and the target interface in a target entry of a label forwarding information base (LFIB) in a corresponding manner, where the target label is stored in an incoming label of the target entry, and the target interface is stored in an outbound interface of the target entry. In some possible implementations, the determining the target interface based on the next-hop node includes determining that the next-hop node is not a neighbor node of the forwarding node, selecting the target interface from an interface other than an interface through which the data packet is received, and storing an identifier of the next-hop node in an outgoing label of the target entry, and before the forwarding the data packet through the target interface, further including pushing, by the forwarding node, the identifier of the next-hop node into the label stack of the data packet.

In the foregoing storage manner, a data storage manner in which an MPLS technology for forwarding is used, so that an existing MPLS protocol is maximally used, with a minimum change made to the protocol.

In some possible implementations, the determining the target interface based on the next-hop node includes determining that the next-hop node is a neighbor node of the forwarding node, determining an interface corresponding to the next-hop node as the target interface, and storing the path-ID in an outgoing label of the target entry.

When forwarding the data packet, the forwarding node may replace a label at the top of a stack of the data packet with the path-ID in the outgoing label. Because the label at the top of the stack of the data packet is also a path-ID, it is equivalent to keeping a same path-ID in the data packet for forwarding. In this way, a next forwarding node that receives the data packet may perform, based on the same path-ID, a same operation as that performed by a previous forwarding node.

In some possible implementations, the address block is an IP address block, and the storing the target label/target address and the target interface in a corresponding manner includes storing the target address and the target interface in a target entry of a forwarding information base (FIB) in a corresponding manner, where the target label is stored in an address of the target entry, and the target interface is stored in an interface of the target entry.

In some possible implementations, the determining the target interface based on the next-hop node includes determining that the next-hop node is a neighbor node of the forwarding node, and determining an interface corresponding to the next-hop node as the target interface. For information about the constrained path, only information about the next-hop node is extracted to determine the target interface, and the target address and the target interface are stored. Therefore, the information about the entire constrained path does not need to be stored, and this minimizes a storage requirement and also meets a characteristic that the forwarding node only forwards data but does not process data.

In some possible implementations, the determining the target interface based on the next-hop node includes determining, by the forwarding node, that the next-hop node is not a neighbor node of the forwarding node, selecting the target interface from an interface other than an interface through which the data packet is received, and storing an identifier of the next-hop node in an address of the target entry. In the foregoing storage manner, a data storage manner in which an IPv6 technology for forwarding is used, so that an existing IPv6 protocol is maximally used, with a minimum change made to the protocol.

A fourth aspect of this application provides a data transmission method, including a transceiver, a memory, and a processor, where the processor is configured to execute a computer-readable instruction in the memory, to perform the following operations receiving a data packet, determining a target node based on a destination IP address of the data packet, determining a path-ID and a corresponding next-hop node based on the target node, where the path-ID is an identifier of a constrained path, the constrained path is a path that consists of at least two nodes arranged in a specific order, the next-hop node is a next node of the source node on the constrained path, and the target node is a last node on the constrained path, pushing the path-ID into a label stack of the data packet, and sending the data packet to the next-hop node.

When the forwarding node receives the data packet, the forwarding node may determine a target label/target address from a local available label block/address block based on the path-ID in the label stack of the data packet and according to the preset rule, search for an outbound interface corresponding to the target label/target address, and forward the data packet through the outbound interface. Therefore, in a network transmission process of the data packet, forwarding nodes are not required to have a same local available label. This avoids a case in which all the forwarding nodes do not have a common local available label.

In some possible implementations, the processor is further configured to receive a path information data packet, where the path information data packet includes the constrained path and the path-ID, determine the next-hop node and the target node based on the constrained path, determine the target CE based on the target node, and store the target CE, the next-hop node, and the path-ID in a corresponding manner.

For information about the constrained path, only information about the next-hop node is extracted to determine the target interface, and the target label/target address and the target interface are stored. Therefore, the information about the entire constrained path does not need to be stored, and this minimizes a storage requirement and also meets a characteristic that the forwarding node only forwards data but does not process data.

A fifth aspect of this application provides a computer-readable storage medium. The computer-readable storage medium stores an instruction, and when the instruction is run on a computer, the computer is enabled to perform the methods according to the foregoing aspects.

A sixth aspect of this application provides a data transmission system, including the forwarding node according to the third aspect and the source node according to the fourth aspect.

It can be learned from the foregoing technical solutions that the embodiments of this application have the following advantages.

When the forwarding node receives the data packet, the forwarding node may determine the target label/target address from the local available label block/address block based on the path-ID in the label stack of the data packet and according to the preset rule, search for the target interface corresponding to the target label/target address, and forward the data packet through the target interface. Therefore, in the network transmission process of the data packet, the forwarding nodes are not required to have the same local available label. This avoids the case in which all the forwarding nodes do not have the common local available label.

BRIEF DESCRIPTION OF THE DRAWINGS

FIG. 1-2 is a schematic diagram of an embodiment of a data transmission method;

FIG. 2-1 is a schematic diagram of a method for setting each node in a network;

FIG. 2-2 is a schematic diagram of an embodiment of a data transmission method;

FIG. 2-3 is a schematic diagram of determining a constrained path to which each node belongs;

FIG. 2-4 is a schematic diagram of available MPLS labels of all nodes;

FIG. 2-5 is a schematic diagram of available MPLS labels of a P3;

FIG. 2-6 is a schematic diagram of determining a next-hop node by each node;

FIG. 2-7 is another schematic diagram of determining a next-hop node by each node;

FIG. 3-1 is a schematic diagram of another embodiment of a data transmission method;

FIG. 3-2 is a schematic diagram of a data packet transmission process;

FIG. 4-1A and FIG. 4-18 are a schematic diagram of still another embodiment of a data transmission method;

FIG. 4-2 is another schematic diagram of a data packet transmission process;

FIG. 5-1 shows a method for setting each node in a network;

FIG. 5-2 is another schematic diagram of a data packet;

FIG. 5-3 is a schematic diagram of available addresses of a P3;

FIG. 6 is a schematic diagram of yet another embodiment of a data transmission method;

FIG. 7-1A and FIG. 7-1B are a schematic diagram of still yet another embodiment of a data transmission method;

FIG. 7-2 is a schematic diagram of a data packet transmission process;

FIG. 8 is a schematic diagram of an embodiment of a forwarding node;

FIG. 9 is a schematic diagram of an embodiment of a source node; and

FIG. 10 is a schematic diagram of an embodiment of a data transmission system.

DETAILED DESCRIPTION OF ILLUSTRATIVE EMBODIMENTS

Embodiments of this application provide a data transmission method, a node, and a system, to determine a target label/target address based on a path-ID in a received data packet, further determine a corresponding target interface, and forward the data packet through the target interface.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
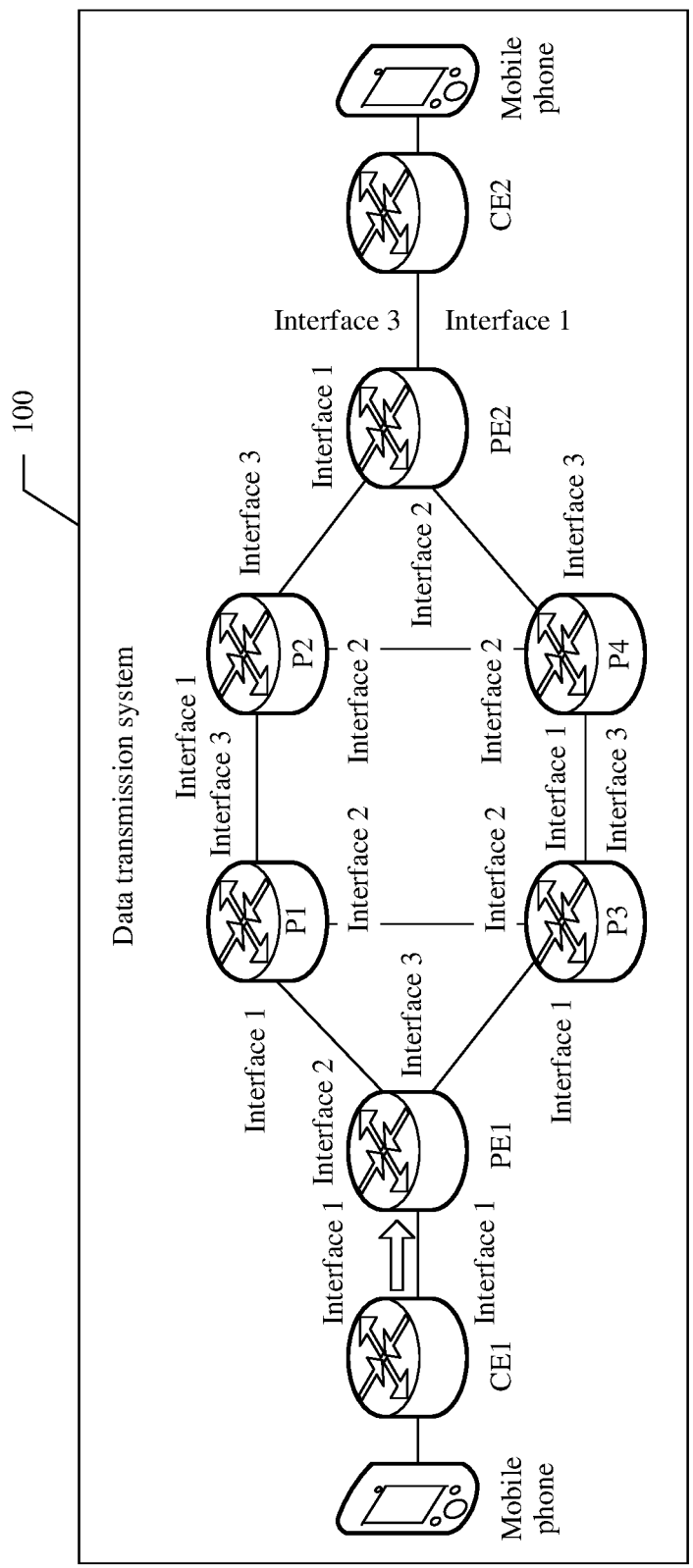
FIG. 1-1 is a schematic diagram of a data transmission system.

As shown in FIG. 1-1 (FIG. 1-1 is a schematic diagram of a data transmission system), this application is applied to a data transmission system 100. The data transmission system 100 includes a provider edge (PE) in a backbone network, a forwarding node, and a customer edge (CE).

The CE is a customer router connected to a network of a service provider. The CE is connected to one or more PEs, to provide service access for users. The CE is usually an IP router and establishes a neighbor relationship with the connected PE. The PE is an edge router in a backbone network of the service provider and is a most important network node. The PE is mainly configured to connect the CE and the forwarding node, so that user traffic flows into a network through the PE. The forwarding node is a device in the backbone network, includes a P router (in FIG. 1-1, P is used to represent a forwarding node), and is responsible for forwarding a data packet.

As shown in FIG. 1-1, the data transmission system 100 includes a P1/P2/P3/P4, a PE1/PE2, and a CE1/CE2. When the CE1 and the CE2 need to communicate with each other, the CE1 and the CE2 may communicate with each other through the P1/P2/P3/P4 and the PE1/PE2. Specifically, the CE1 may send information to the PE1, so that the PE1 sends the information to the PE2 through the P1/P2/P3/P4, and then the PE2 sends the information to the CE2. For example, a user uses a mobile phone to access the internet at home. When the user sends information to a mobile phone of another user by using chat software, the user may use the mobile phone to connect to a home router (the CE1), and the home router (the CE1) is connected to the PE1 to access a backbone network. The mobile phone sends the information, as a data packet, to the home router (the CE1). The home router (the CE1) sends the data packet to the PE1 based on a destination IP address carried in the data packet. The PE1 forwards the data packet to a forwarding node (the P3) based on the destination IP address. The forwarding node (the P3) forwards the data packet to another forwarding node (the P1). The forwarding node (the P1) forwards the data packet to another forwarding node (the P2). The forwarding node (the P2) forwards the data packet to another forwarding node (the PE2). The PE2 forwards the data packet to a peer home router (the CE2). Finally, the peer home router (the CE2) sends the data packet to the mobile phone of the peer user. It can be learned that in the foregoing forwarding process of the data packet, a path in the network is PE1->P3->P1->P2->PE2.

It should be noted that each node (the CE/PE/forwarding node) has at least one interface, and different interfaces correspond to different neighbor nodes. As shown in FIG. 1-1, the PE1 has at least three interfaces: an interface 1, an interface 2, and an interface 3. The interface 1 is configured to send information to the CE1 and receive information from the CE1. The interface 2 is configured to send information to the P3 and receive information from the P3. The interface 3 is configured to send information to the P1 and receive information from the P1. For example, the P3 has at least three interfaces: an interface 1, an interface 2, and an interface 3. The interface 1 is configured to send information to the PE1 and receive the information from the PE1. The interface 2 is configured to send information to the P1 and receive the information from the P1. The interface 3 is configured to send information to the P4 and receive information from the P4. As shown in FIG. 1-1, the PE1 sends a data packet to the P3 through the interface 3, and the P3 receives the data packet through the interface 1 and forwards the data packet to the P1 through the interface 2. It should be noted that, in the backbone network, if two nodes (a PE or a forwarding node) can directly and mutually send and receive information through an interface, the two nodes are referred to as neighbor nodes, and one node is a neighbor node of the other node. As shown in FIG. 1-1, neighbor nodes of the PE1 include the P1 and the P3, and the PE1 is also a neighbor node of the P1 and the P3.

In some possible implementations, the nodes in the data transmission system 100 may communicate with each other by using an MPLS technology, or may communicate with each other by using an IPv6 technology. This is not limited herein.

In a transmission process of a data packet, to improve transmission efficiency, transmission is performed according to a principle of a shortest transmission path (a path on which a data packet passes through a minimum quantity of nodes). As shown in FIG. 1-1, after receiving the data packet, the PE1 may select a shortest transmission path, for example, PE1->P3->P4->PE2 or PE1->P1->P2->PE2. In some cases, for load balancing, when selecting a neighbor node to which the data packet is to be forwarded, the forwarding node considers a comparatively "idle" node. For example, when forwarding the data packet, the P1 may transmit the data packet to the P3 or the P2. If the P3 is comparatively "busy", and the P2 is comparatively "idle", the P1 may preferentially transmit the data packet to the P2.

In some cases, to meet a requirement such as charging, information security, or a firewall, a path of a data packet needs to be constrained, to restrict the data packet to passing through some specific nodes. Such a formed path is referred to as a constrained path. The constrained path is a path that consists of a plurality of nodes arranged in an order. For example, when the PE1 needs to transmit the data packet to the PE2, the data packet needs to pass through the P3 and the P2. After the PE1 sends the data packet to the P3, the P3 may send the data packet to the P1 or the P4, then the P1 or the P4 forwards the data packet to the P2, and finally, the P2 forwards the data packet to the PE2. The constrained path is PE1->P3->P2->PE2.

It should be noted that there are mainly two types of constrained paths: a strictly constrained path and a loosely constrained path. If at least two neighbor nodes on the constrained path are not neighbor nodes in a network, such a constrained path is referred to as a loosely constrained path. For example, on the constrained path PE1->P3->P2->PE2, because the P2 and the P3 are not neighbor nodes, the constrained path is referred to as a loosely constrained path. If any two neighbor nodes on the constrained path are neighbor nodes in a network, such a constrained path is referred to as a strictly constrained path. For example, the constrained path PE1->P3->P1->P2->PE2 is a strictly constrained path. It should be noted that the constrained path may be preset by a system or a control node, or may be set by a source node. This is not limited herein. After a constrained path is set, for example, PE1->P3->P2->PE2, a next node of a node on the constrained path is referred to as a next-hop node. For example, a next-hop node of the PE1 is the P3, and a next-hop node of the P3 is the P2.

It should be noted that, on a constrained path, a start node is referred to as a source node, an end node is referred to as a target node, and a node that is configured to forward a data packet in a process is referred to as a forwarding node. Therefore, one constrained path includes at least a source node, a target node, and at least one forwarding node. The source node may be a PE or a forwarding node. This is not limited herein. After receiving a data packet, the source node transmits the data packet to the target node through the constrained path. The forwarding node is a node in a network, and is configured to receive the data packet that is sent by the source node or a previous forwarding node, and forward the data packet to a next forwarding node or the target node. Currently, an SR technology may be used to implement that a data packet is transmitted along a constrained path. SR is a source routing technology, and is used to indicate a forwarding path for transmitting a data packet from a source node to a target node in a network. Specifically, the source node may add a segment to the data packet in a specific order as an instruction for instructing to forward the data packet in the network. Such a segment is referred to as a SID. One SID is used to indicate one node, and a plurality of SIDs are arranged in a specific order to obtain a SID list. The SID list is encoded into a label stack of the data packet, so that when the data packet reaches a node, the node determines a next-hop node based on the SID list carried in the data packet, and sends the data packet to the next-hop node.

For example, if the PE1 shown in FIG. 1-1 needs to transmit the data packet to the PE2 along the strictly constrained path (PE1->P3->P1->P2->PE2), the PE1 needs to successively push identifiers of the PE2, the P2, the P1, and the P3 into the label stack of the data packet. If the identifiers of the PE2, the P2, the P1, and the P3 are 16004, 16005, 16006, and 16605 respectively, entries in the SID list in the label stack of the PE1 are 16004, 16005, 16006, and 16605 respectively, and a structure of the data packet is obtained as shown in the following Table 1.

TABLE 1

| |
|---|
| 16004 |
| 16005 |
| 16006 |
| 16605 |
| Load |

The PE1 identifies the P3 based on an identifier at the top of the label stack, and forwards the data packet to the P3. After the P3 receives the data packet, the P3 pops out the identifier "16004" of the P3, that is, the P3 deletes the identifier "16004" from the top of the stack. In this case, a structure of the data packet is as follows.

TABLE 2

| |
|---|
| 16005 |
| 16006 |
| 16605 |
| Load |

Then, the P3 identifies that a next-hop node is the P1 whose identifier is "16005", and sends the data packet shown in Table 2 to the P1. Next, the P1 performs operations the same as the operations performed by the P3: popping out "16005", and sending the processed data packet to the P2. The operations are repeated until the data packet is sent to the PE2. And then, the PE2 forwards the data packet to the CE2, and the CE2 sends the data packet to user equipment. It should be noted that the next-hop node is a next node of the node P3 on the constrained path.

In some possible implementations, if the PE1 shown in FIG. 1-1 needs to transmit the data packet to the PE2 along the loosely constrained path (PE1->P3->P2->PE2), it can be learned from FIG. 1-1 that the P3 and the P2 are not neighbor nodes. After receiving the data packet, the P3 identifies an identifier of the P2, and may forward the data packet to the P1 or the P4 according to a shortest path principle or a load balancing principle, so that the P1 or the P4 forwards the data packet to the P2.

However, if the data packet needs to pass through a large quantity of nodes, the SID list in the label stack is excessively long, and a data amount of the label stack of the data packet is excessively large. Consequently, a proportion of load of the data packet is reduced, and transmission efficiency is low. To resolve this problem, the source node may determine a label for the constrained path, for example, an MPLS label in the MPLS technology, and notify all nodes on the constrained path, so that all the nodes on the constrained path obtain the MPLS label of the constrained path in advance. In this case, the node determines a corresponding interface for the constrained path, where the corresponding interface is used to indicate a next-hop node on the constrained path.

The following uses an example for description. If the constrained path is the strictly constrained path (PE1->P3->P1->P2->PE2), the PE1 may locally allocate an MPLS label to the constrained path in advance, for example, 16005 (which is denoted as a SID1 below), and notify the entire network of the MPLS label, so that the P3, the P1, the P2, and the PE2 on the constrained path all allocate the MPLS label, that is, the SID1, to the constrained path. Using the P3 as an example, after obtaining the constrained path and the corresponding MPLS label, the P3 may locally allocate the MPLS label, which is also the SID1, to the constrained path. The P3 may determine the next-hop node P1 based on the constrained path, and determine the interface 2 corresponding to the next-hop node P1. It should be noted that the MPLS label is a 32-bit binary value. The following uses a "SID" for representation, for example, SID1/SID2/SID3, as shown in the following Table 3.

TABLE 3

| |
|---|
| SID 1 |
| Load |

The PE1 may send the data packet to the forwarding node P3, and the label stack of the data packet includes the SID1. Because the P3 pre-determines, for the constrained path, the MPLS label that is the SID1, the P3 may identify the SID1 as the identifier of the constrained path, determine the corresponding interface 2 based on the SID1, and forward the data packet to the P1 through the interface 2. The P1 performs similar operations, until the data packet is forwarded to the PE2.

In this way, when the source node sends the data packet and the forwarding node forwards the data packet, only the MPLS label of the constrained path instead of all identifiers in the SID list of the entire constrained path may be pushed into the label stack of the data packet. In this way, a proportion of the label stack of the data packet is reduced, and the proportion of the load is increased, so that data transmission efficiency is improved.

However, in this method, each node on a same constrained path needs to use an MPLS label. However, because a quantity of MPLS labels is limited, all nodes on the constrained path may not have a same available MPLS label. Even if all nodes indicated in the SID list have a same available MPLS label, the nodes need to negotiate with each other. It is not easy to execute the negotiation.

Figures 1, 2:
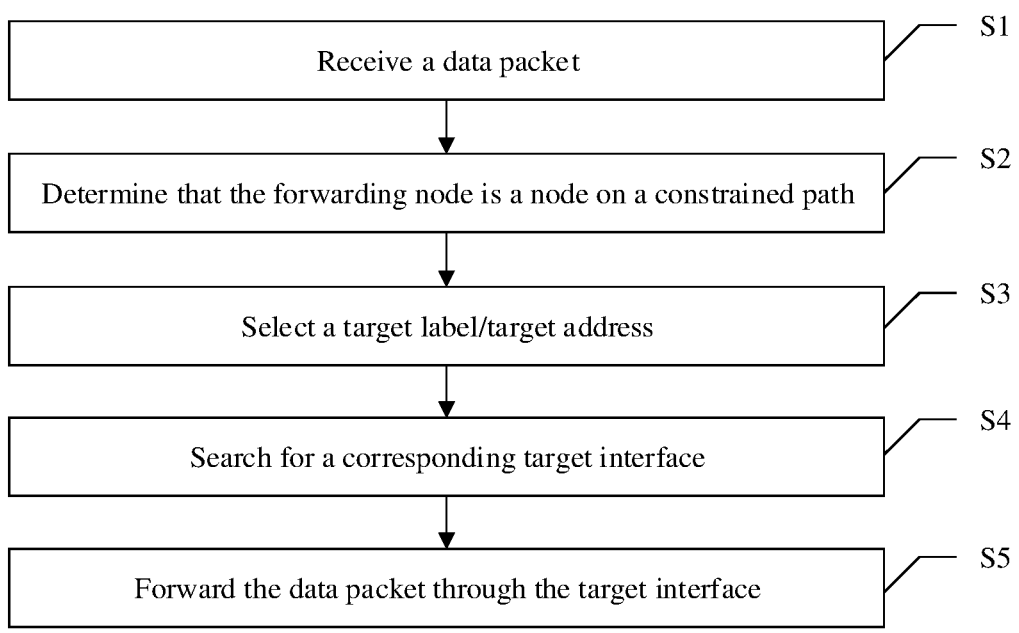

Therefore, this application provides a data transmission method. Referring to FIG. 1-2, the method includes the following steps.

S1: A forwarding node receives a data packet, where a label stack of the data packet includes a path identifier path-ID, the path-ID is an identifier of a constrained path, and the constrained path is a path that consists of at least two nodes arranged in a specific order.

S2: The forwarding node determines that the forwarding node is a node on the constrained path.

S3: The forwarding node selects a target label/target address from a local available label block/address block based on the path-ID and according to a preset rule, where the label block/address block includes at least one label/address.

S4: The forwarding node searches for a corresponding target interface based on the target label/target address.

S5: The forwarding node forwards the data packet through the target interface.

According to the foregoing steps, in a process of forwarding the data packet between forwarding nodes, the forwarding node identifies the path-ID in the label stack of the data packet, determines an MPLS label from at least one local available MPLS label as the target label based on the path-ID and according to the preset rule, searches a forwarding information base for the target interface corresponding to the target label, and forwards the data packet through an outbound interface. Therefore, the label stack of the data packet does not need to include a same local available MPLS label of all forwarding nodes. This avoids a case in which all the forwarding nodes do not have a same local available MPLS label. Therefore, all the forwarding nodes do not need to negotiate with each other to determine a same local available label, so that execution difficulty is reduced.

In view of this, this application provides a data transmission method, a node, and a system, to determine a target label/target address based on a path-ID in a received data packet, further determine a corresponding target interface, and forward the data packet through the target interface. Constrained paths include a strictly constrained path and a loosely constrained path. Nodes extract and store information in the strictly constrained path and the loosely constrained path in different methods. In addition, when an MPLS technology or a non-MPLS technology (such as an IPv6 technology) is used, processing processes are also different, and are separately described by using different embodiments in the following.

Embodiment 1: MPLS Technology

This embodiment of this application is divided into two parts. Part one is used to describe setting of each node in a network, and part two is used to describe transmission and reception of a data packet between nodes in the network after setting.

Part one: FIG. 2-1 shows a method for setting each node in a network. The method includes the following steps.

201: A control node sends a path information data packet to a node.

In this embodiment of this application, each node in a network first receives the path information data packet. The path information data packet may be flooded in the network by the control node. The control node is configured to flood the path information data packet. The control node may be an independent node in the network, or may be one of nodes configured to forward a data packet. This is not limited herein. In some possible implementations, a network administrator may manually set different constrained paths on the control node, or may enter a policy for generating different constrained paths, so that the control node generates the different constrained paths according to the policy. In some possible implementations, a node may alternatively send a request message to the control node to request a constrained path. This is not limited herein.

It should be noted that the path information data packet includes a constrained path list, the constrained path list includes at least one entry, and each entry stores one constrained path and a corresponding path-ID. With reference to the data transmission system in FIG. 1-1, the constrained path list may include two entries: a constrained path whose path-ID is 2 and a constrained path whose path-ID is 3. The constrained paths are PE1->P3->P1->P2->PE2 and PE1->P3->P2->PE2, as shown in Table 4.

TABLE 4

| Path-ID | Constrained path |
| --- | --- |
| 2 | PE1 -> P3 -> P1 -> P2 -> PE2 |
| 3 | P3 -> P1 -> P2 -> PE2 |

202: The node identifies a constrained path on which the node is located.

A node that receives the path information data packet searches the constrained path list shown in Table 4 to determine a constrained path on which the node is located. For example, the PE1 finds that constrained paths on which the PE1 is located are the constrained path whose path-ID is 2 and the constrained path whose path-ID is 3, and the P3 finds that a constrained path on which the P3 is located is the constrained path whose path-ID is 2.

After the node determines the constrained path on which the node is located, the node may extract information based on information in the constrained path on which the node is located, and store the information in a forwarding information base FIB or a label forwarding information base LFIB, to use the information when sending or forwarding a data packet. It should be noted that, if the node does not find the constrained path on which the node is located in the entire constrained path list, the node may discard the path information data packet. If the P2 finds that the P2 is not on any constrained path on the constrained path list shown in Table 4, the P2 may discard the path information data packet.

As shown in Table 4, it can be learned, with reference to FIG. 1-1, that the constrained path whose path-ID is 2 is a strictly constrained path, and the constrained path whose path-ID is 3 is a loosely constrained path.

Figures 1, 2:
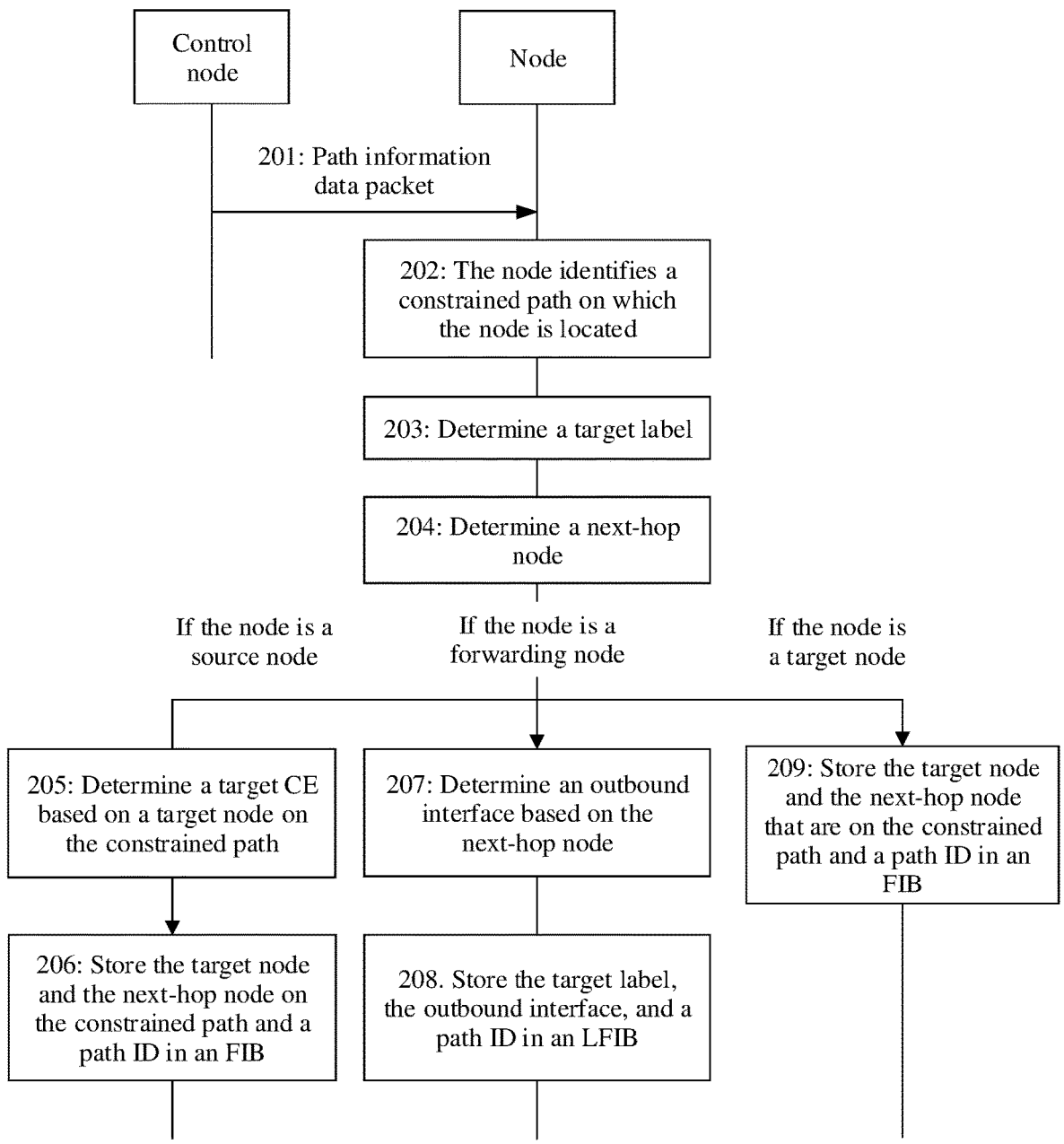
Figure 2:
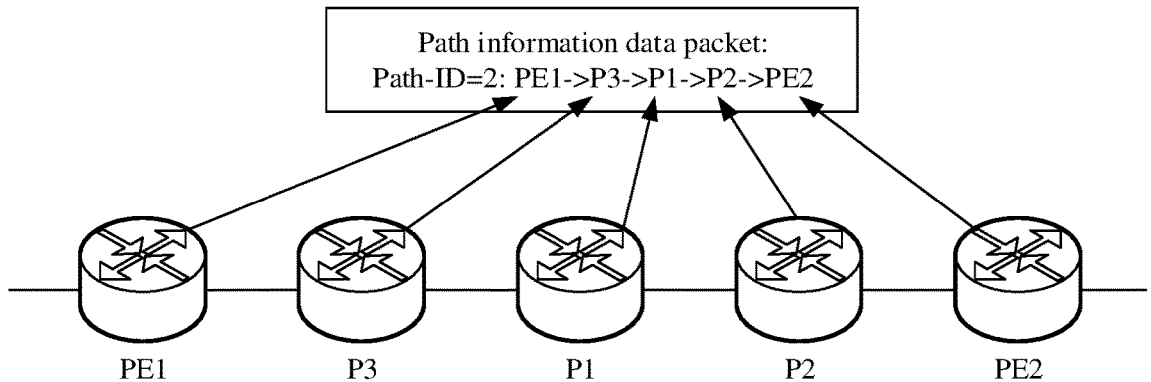
Figures 2, 3:
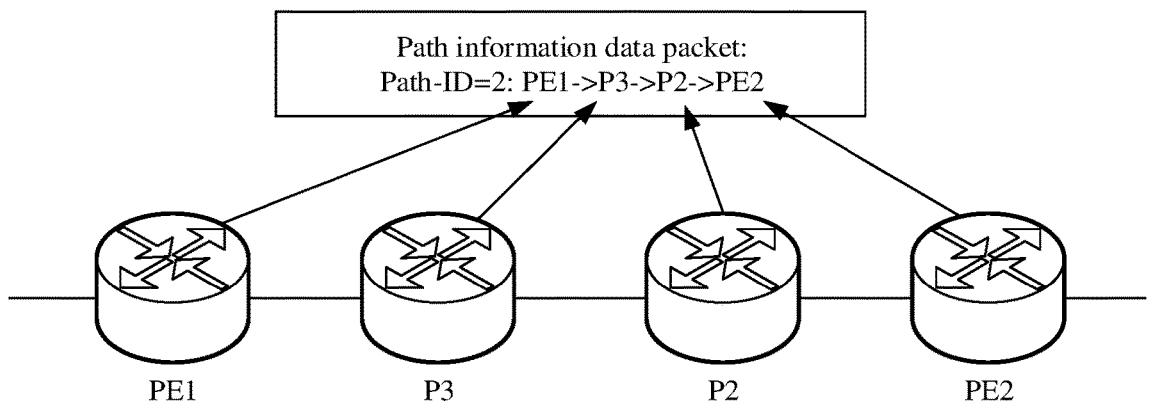

In this embodiment of this application, as shown in FIG. 2-2 (FIG. 2-2 is a schematic diagram of an embodiment of a data transmission method), after nodes (the PE1, the P3, the P1, the P2, and the PE2) on a constrained path whose path-ID is 2 receive the path information data packet, the nodes determine, by querying information about the nodes on the constrained path, that the nodes are on the constrained path whose path-ID is 2. The PE1 is a source node, the P3, the P1, and the P2 are forwarding nodes, and the PE2 is a target node. As shown in FIG. 2-3 (FIG. 2-3 is a schematic diagram of determining a constrained path to which each node belongs), after nodes (the PE1, the P3, the P2, and the PE2) on a constrained path whose path-ID is 3 receive the path information data packet, the nodes determine, by querying information about the nodes on the constrained path, that the nodes are on the constrained path whose path-ID is 3. The PE1 is a source node, the P3 and the P2 are forwarding nodes, and the PE2 is a target node.

In this embodiment of this application, if the node determines that the node is a source node, the node extracts required information based on the constrained path on which the node is located, and stores the information in the FIB. If the node determines that the node is a forwarding node or a target node, the node extracts required information based on the constrained path on which the node is located, and stores the information in the LFIB.

203: The node determines a target label corresponding to the path-ID.

It should be noted that the MPLS label is a 32-bit binary value, and a total quantity of MPLS labels that can be identified by the 32-bit binary value is limited. Each forwarding node may select one of at least one local available MPLS label as the target label of the constrained path according to a preset rule. It should be noted that "at least one local available MPLS label" may also be referred to as a label block.

In some possible implementations, the preset rule may be selecting, as the target label, the $X^{th}$ MPLS label from the at least one local available MPLS label in a preset order by using a value of the path-ID as an offset X. Specifically, the preset order is an order of label/address values arranged in ascending order. In some possible implementations, the preset order may be alternatively an order of label/address values arranged in descending order or in another order, and this is not limited herein. In this embodiment of this application, if the offset X=2, the preset rule may be selecting, as the target label, the second MPLS label from the at least one local available MPLS label in ascending order. If the offset X=3, the preset rule may be selecting, as the target label, the third MPLS label from the at least one local available MPLS label in ascending order.

Figures 2, 3, 4:
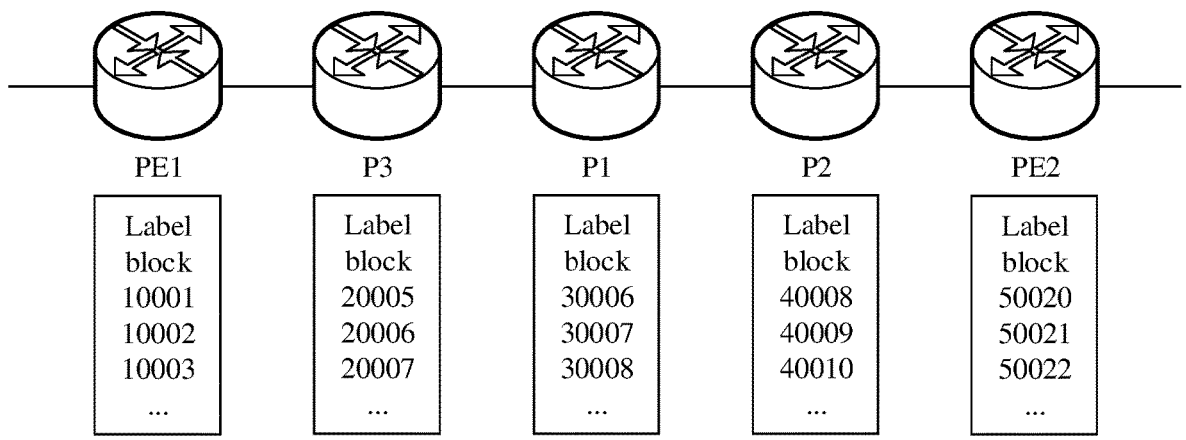

As shown in FIG. 2-4 (FIG. 2-4 is a schematic diagram of available MPLS labels of all nodes), assuming that local available MPLS labels of the PE1 are arranged in ascending order as 10001, 10002, 10003, . . . , local available MPLS labels of the P3 are arranged in ascending order as 20005, 20006, 20007, . . . , local available MPLS labels of the P1 are arranged in ascending order as 30006, 30007, 30008, . . . , local available MPLS labels of the P2 are arranged in ascending order as 40008, 40009, 40010, . . . , and local available MPLS labels of the PE2 are arranged in ascending order as 50020, 50021, 50022, . . . , the second MPLS label is 40009, and based on Path-ID=2, that is, offset X=2, the second MPLS label of the P2 is 20006, the second MPLS label of the P1 is 30007, and the second MPLS label of the P2 is 40009, and based on Path-ID=3, that is, offset X=3, the third MPLS label of the P2 is 20007, the third MPLS label of the P1 is 30008, and the third MPLS label of the P2 is 40010.

It should be noted that the local available MPLS label is dynamic and may be updated at any time. For example, in the local MPLS labels of the P3, an identifier 19001 is originally unavailable. After the P3 allocates the MPLS label 20006 to the constrained path whose path-ID is 2, the identifier 19001 may be idle and becomes an available MPLS label. As shown in FIG. 2-5 (FIG. 2-5 is a schematic diagram of available MPLS labels of the P3), the P3 may reallocate an MPLS label to the constrained path whose path-ID is 2. The P3 selects the second MPLS label, that is, 20005, from the at least one local available MPLS label in ascending order according to the same preset rule.

204: The node determines a next-hop node based on the constrained path, where the next-hop node is a next node of the node on the constrained path.

In this embodiment of this application, as shown in FIG. 2-6 (FIG. 2-6 is a schematic diagram of determining a next-hop node by each node), the PE1, the P3, the P1, the P2, and the PE2 each determine a next-hop node based on the constrained path whose path-ID is 2. A next-hop node of the PE1 is the P3, a next-hop node of the P3 is the P1, a next-hop node of the P1 is the P2, and a next-hop node of the P2 is the PE2. Because the PE2 is the target node, as shown in FIG. 1-1, a next-hop node of the PE2 is the CE2.

In this embodiment of this application, as shown in FIG. 2-7 (FIG. 2-7 is another schematic diagram of determining a next-hop node by each node), the PE1, the P3, the P2, and the PE2 each determine a next-hop node based on the constrained path whose path-ID is 3. A next-hop node of the PE1 is the P3, a next-hop node of the P3 is the P2, and a next-hop node of the P2 is the PE2. Because the PE2 is the target node, as shown in FIG. 1-1, a next-hop node of the PE2 is the CE2.

205: The source node determines a target CE based on the target node on the constrained path.

In this embodiment of this application, after determining the next-hop node based on the constrained path, the PE1 serving as the source node may determine a corresponding CE as a target CE based on the target node on the constrained path. In the data transmission system shown in FIG. 1-1, a target CE corresponding to the PE2 is the CE 2. It should be noted that one PE may correspond to a plurality of CEs, or may correspond to one CE. This is not limited herein.

206: The source node stores the target CE, the next-hop node, and the path-ID in the FIB.

In this embodiment of this application, the PE1 may store the corresponding target CE, the corresponding next-hop node, and the corresponding path-ID in an entry of the FIB. It should be noted that, in this embodiment of this application, the PE1 may obtain two entries: the CE 2, Path-ID=2, and that a next-hop node is the P3, and the CE 2, Path-ID=3, and that a next-hop node is the P3. If a constrained path whose path-ID=4 is PE1->P1->P2->PE2, the target CE of the PE1 is the CE2, the next hop node is the P1, and the corresponding label is 4.

The FIB of the PE1 may be obtained as follows.

TABLE 5

| FIB of the PE1 | | |
|---|---|---|
| Target node | Next-hop node | Label |
| CE2 | P3 | 2 |
| CE2 | P3 | 3 |
| CE2 | P1 | 4 |

The label in the FIB stores values of the path-ID.

In some possible implementations, the PE1 may further store a 5-tuple on the target node, and determine the next-hop node based on the 5-tuple. The 5-tuple includes a source IP address, a source port, a destination IP address, a destination port, and a transport layer protocol. In some possible implementations, the target node may further store other data, provided that the other data may correspond to a next-hop node. This is not limited herein.

207: The forwarding node determines an outbound interface based on the next-hop node.

In this embodiment of this application, after determining the next-hop node, the forwarding node may determine the outbound interface based on the next-hop node. As shown in FIG. 1-1, on the constrained path whose path-ID is 2, the interface 1 of the P3 corresponds to the P1, the interface 3 of the P1 corresponds to the P2, and the interface 3 of the P2 corresponds to the PE2. In this case, an outbound interface of the P3 is the interface 1, an outbound interface of the P1 is the interface 3, and an outbound interface of the P2 is the interface 3.

On the constrained path whose path-ID is 3, because the constrained path whose path-ID is 3 is a loosely constrained path, a next-hop node of a node may not be a neighbor node of the node. For example, a next-hop node of the P3 is the P2, but the P2 is not a neighbor node of the P3, and a next-hop node of the P2 is the PE2, and the PE2 is a neighbor node of the P2. For the forwarding node P3 or P2, if a next-hop node of the forwarding node P3 or P2 is a neighbor node of the forwarding node P3 or P2, the forwarding node P3 or P2 determines an interface corresponding to the neighbor node as an outbound interface, to be specific, an interface determined by the P2 is the interface 3. If a next-hop node of the forwarding node P3 or P2 is not a neighbor node of the forwarding node P3 or P2, for example, the P2 is not a neighbor node of the P3, the P3 selects one interface from a plurality of interfaces based on the next-hop node (the P2) as an outbound interface, to be specific, the P3 selects one of the interface 2 (corresponding to the P1) or the interface 3 (corresponding to the P4) as the outbound interface. In some possible implementations, the P3 may select the outbound interface according to a shortest path principle. To be specific, the P3 determines a shorter path between a path from the P1 to the P2 and a path from the P4 to the P2, and selects the shorter path. In this embodiment of this application, if the two paths have a same length, the P3 may select the outbound interface according to a load balancing principle. To be specific, the P3 may select a comparatively "idle" node. If the P1 is comparatively busy, the P3 selects the P4, or if the P4 is comparatively busy, the P3 selects the P1.

208: The forwarding node stores the target label, the outbound interface, and the path-ID in the label forwarding information base LFIB.

In this embodiment of this application, the forwarding nodes P3, P1, and P2 each may store the target label, the outbound interface, and the path-ID in the LFIB. The target label is stored in an incoming label, the path-ID is stored in an outgoing label, and the outbound interface is stored in an outbound interface. In this case, an LFIB of the P3 is obtained as follows.

TABLE 6

| LFIB of the P3 | | |
|---|---|---|
| Incoming label | Outgoing label | Outbound interface |
| 20006 | 2 | Interface 2 |
| 20007 | 3 | Interface 3 |

It should be noted that, on the constrained path whose path-ID is 3, the outbound interface of the P3 may be the interface 2 or the interface 3. In this embodiment of this application, the interface 3 is used as an example for description. It should be noted that, in the LFIB of the forwarding node, an incoming label one-to-one corresponds to an outgoing label. To be specific, one outgoing label may be uniquely determined based on one incoming label, one incoming label may be uniquely determined based on one outgoing label, two different incoming labels definitely correspond to different outgoing labels, and different outgoing labels definitely correspond to different incoming labels. However, an outbound interface does not necessarily one-to-one correspond to an incoming label or an outgoing label, to be specific, different incoming labels/outgoing labels may correspond to a same outbound interface or may correspond to different outbound interfaces. An LFIB of the P1 is as follows.

TABLE 7

| LFIB of the P1 | | |
|---|---|---|
| Incoming label | Outgoing label | Outbound interface |
| 30007 | 2 | Interface 3 |

It should be noted that, in this embodiment of this application, the P1 is on the constrained path whose path-ID is 2 but is not on the constrained path whose path-ID is 3. Therefore, only one entry is shown herein. An LFIB of the P2 is as follows.

TABLE 8

| LFIB of the P2 | | |
|---|---|---|
| Incoming label | Outgoing label | Outbound interface |
| 40009 | 2 | Interface 3 |
| 40010 | 3 | Interface 3 |

209: The target node stores the target label, a pop operation, and the path-ID in the LFIB.

It should be noted that the target node on the constrained path needs to send the received data packet to the CE2. Therefore, the PE2 serving as the target node on the constrained path whose path-ID is 2 and on the constrained path whose path-ID is 3 may store the path-IDs, the corresponding target labels, the pop operation (POP) in entries of the LFIB, where the pop operation is used to remove a SID at the top of a stack from the label stack of the received data packet. Assuming that local available MPLS label blocks of the PE2 are arranged in ascending order as 50020, 50021, 50022, . . . , based on the information that Path-ID=2 and Path-ID=3, the PE2 determines that the second MPLS label is 50021 and the third MPLS label is 50022. The following table is obtained.

TABLE 9

| LFIB of the PE2 | | |
|---|---|---|
| Incoming label | Outgoing label | Outbound interface |
| 50021 | POP | Interface 1 |
| 50022 | POP | Interface 1 |

According to steps 201 to 209 in part one, each node on the constrained path extracts and stores information from the constrained path list in the path information data packet. The following separately uses steps 301 to 310 and the constrained path (PE1->P3->P1->P2->PE2) whose path-ID is 2, and steps 401 to 416 and the constrained path (PE1->P3->P2->PE2) whose path-ID is 3 in part two as examples for description.

Part two: FIG. 3-1 shows a data transmission method, including the following steps.

1. Strictly Constrained Path

301: The PE1 receives a data packet sent by a CE1.

In this embodiment of this application, the PE1 may receive the data packet sent by the CE1. In some possible implementations, the data packet is sent by a terminal (for example, a mobile phone) to the CE1, and the CE1 forwards the data packet to the PE1 based on a destination IP address of the data packet.

302: The PE1 determines a target CE based on the destination IP address of the data packet.

The data packet includes the destination IP address, the destination IP address includes a network identifier and a host identifier, and the PE1 may determine the target CE based in the network identifier. For example, in the data transmission system shown in FIG. 1-1, the PE1 receives the data packet from the CE1, where the target CE of the data packet is the CE2.

303: The PE1 searches an FIB for a next-hop node and a label based on the target CE.

In this embodiment of this application, the PE1 may query entries in the FIB based on the PE2, to obtain the entries shown in Table 5. In this case, the PE1 may determine, based on the entries, that the next-hop node is the P3 and the label is 2.

304: The PE1 determines a corresponding interface based on the next-hop node.

In this embodiment of this application, the PE1 may determine, based on the next-hop node P3, the interface through which the data packet is sent. As shown in FIG. 1-1, the P3 is a neighbor node of the PE1, and the P3 corresponds to the interface 3 of the PE1. Therefore, the PE1 may determine that the interface corresponding to the P3 is the interface 3.

305: The PE1 pushes Path-ID=2 into a label stack of the data packet.

In this embodiment of this application, before the PE1 sends the data packet, as shown in FIG. 3-2 (FIG. 3-2 is a schematic diagram of a transmission process of a data packet), the PE1 pushes Path-ID=2 into the label stack of the data packet, to obtain a structure of the data packet shown in the following table.

TABLE 10

| Path-ID = 2 |
| Load |

306: The PE1 sends the data packet through the interface 3.

In this embodiment of this application, after pushing the Path-ID=2, the PE1 may send the data packet to the P3 through the interface 3.

307: The P3 determines, as a target label, an MPLS label from a local available label block based on Path-ID=2 and according to a preset rule.

In this embodiment of this application, as shown in FIG. 3-2, the P3 identifies, by viewing the bottom of the label stack of the data packet, that Path-ID=2, and then determines, as the target label, the MPLS label from the local available label block according to the preset rule. In some possible implementations, the preset rule may be selecting, as the target label, the second MPLS label from at least one local available MPLS label in a preset order by using a value of the path-ID as an offset X, that is, X=2. For example, the preset order is ascending order. Assuming that the local available MPLS labels of the P3 are 20005, 20006, 20007, . . . , the second MPLS label is 20006 in ascending order, that is, the target label is 20006. In some possible implementations, assuming that the local available MPLS labels of the P3 are 19001, 20005, 20006, . . . , the second MPLS label is 20005 in ascending order, that is, the target label is 20005. In some possible implementations, the preset order may be alternatively descending order, and this is not limited herein. In this embodiment of this application, an example in which the target label of the P3 is 20006 is used for description.

Because a manner of determining the target label by the P3 is the same as a manner of determining the target label by the PE1, the same target label may be determined in the same manner. Therefore, using Path-ID=2 as an identifier of the constrained path, the data packet may need to carry a value of only the path-ID, and all forwarding nodes do not need to have a same local available MPLS label. This avoids a case in which all the forwarding nodes do not have a same local available MPLS label.

308: The P3 searches an LFIB for an outbound interface and an outgoing label that correspond to the identifier 20006.

After determining the target label 20006, the P3 may search, based on the identifier 20006, the LFIB shown in Table 6 for the corresponding outbound interface, to obtain that the outbound interface is the interface 2 and the outgoing label is 2. It should be noted that the outbound interface is an interface through which the data packet is sent. After determining that the outbound interface is the interface 2, where the interface 2 corresponds to the P1, the P3 may send the data packet to the P1 through the interface 2. The value in the outgoing label is used to be pushed into the data packet, and is used to indicate the node that receives the data packet to determine the path-ID.

309: The P3 forwards the data packet to the P1 through the interface 2.

After determining that the outbound interface is the interface 2, as shown in FIG. 3-2, the P3 may forward the data packet to the P1 through the interface 2. It should be noted that the data packet still retains the structure shown in Table 10.

In this embodiment of this application, after the P1 receives the data packet, as shown in FIG. 3-2, the P1 may forward the data packet to the P2 by performing steps similar to steps 306 to 308, and the P2 may forward the data packet to the PE2 by performing steps similar to steps 306 to 308. Details are not described herein again.

310: The PE2 sends the data packet to the CE2.

After receiving the data packet, as shown the LFIB shown in FIG. 9, the PE2 pops out the Path-ID=2 from the label stack of the data packet by performing a pop operation (POP), so that a structure of the data packet is shown in the following table.

TABLE 11

| Load |

After performing the pop operation, the PE2 determines, based on Table 9, that the outbound interface is the interface 1, and sends the data packet to the CE2 from the interface 1, so that the CE2 sends the data packet to a user terminal.

1. Loosely Constrained Path

It should be noted that the strictly constrained path may be considered as a special case of the loosely constrained path.

Figures 1A, 4:
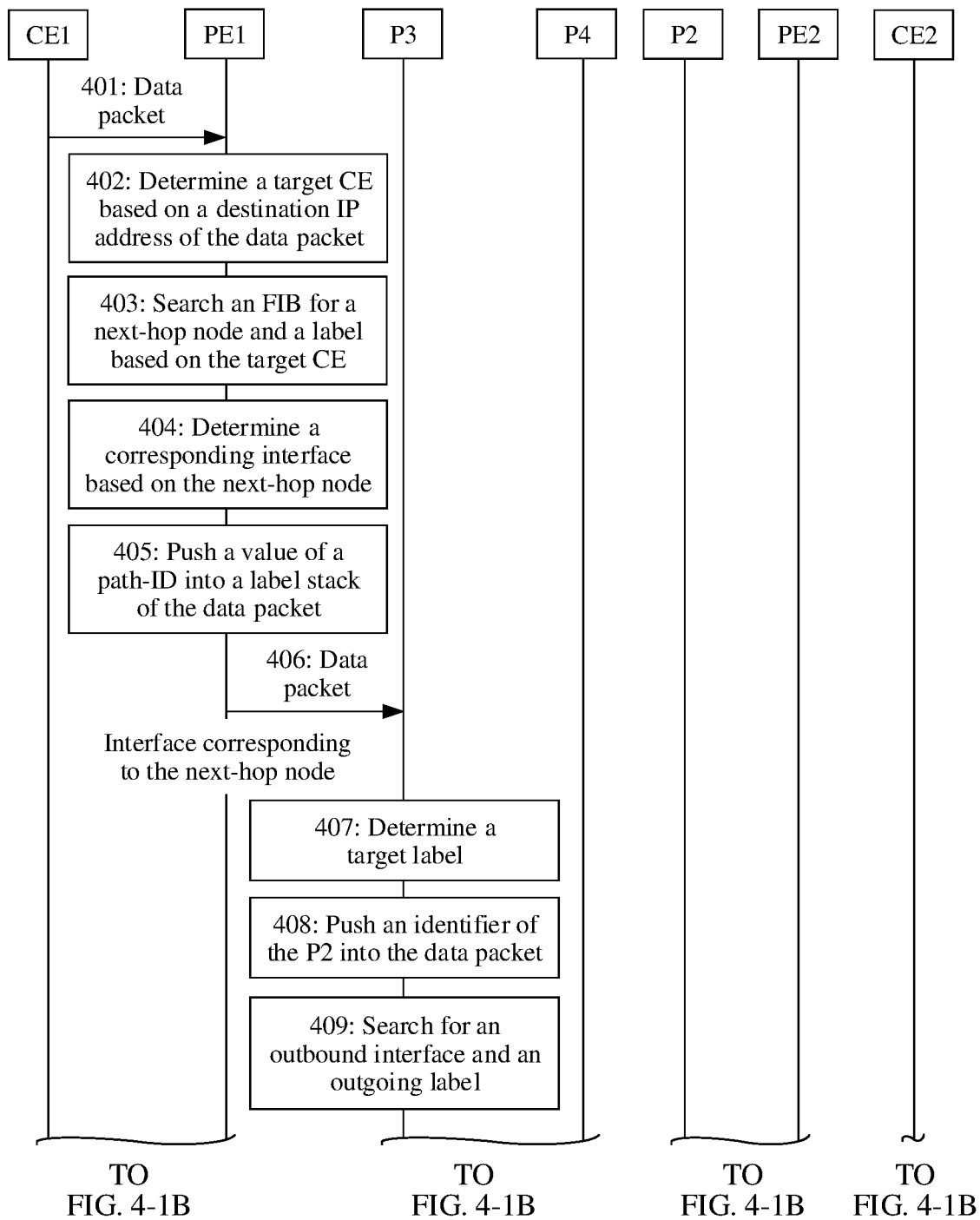
Figures 1B, 4:
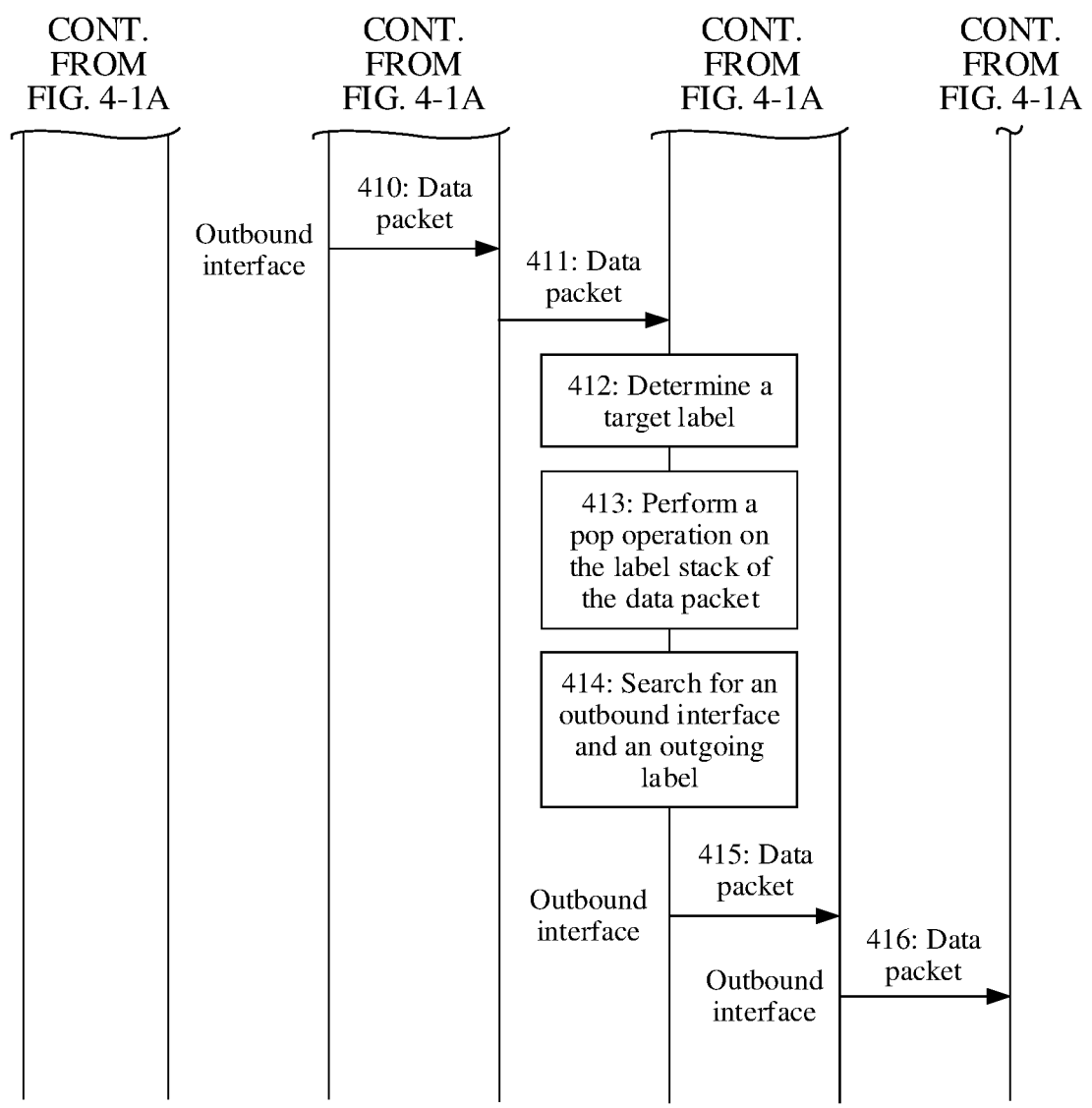
Figures 2, 4:
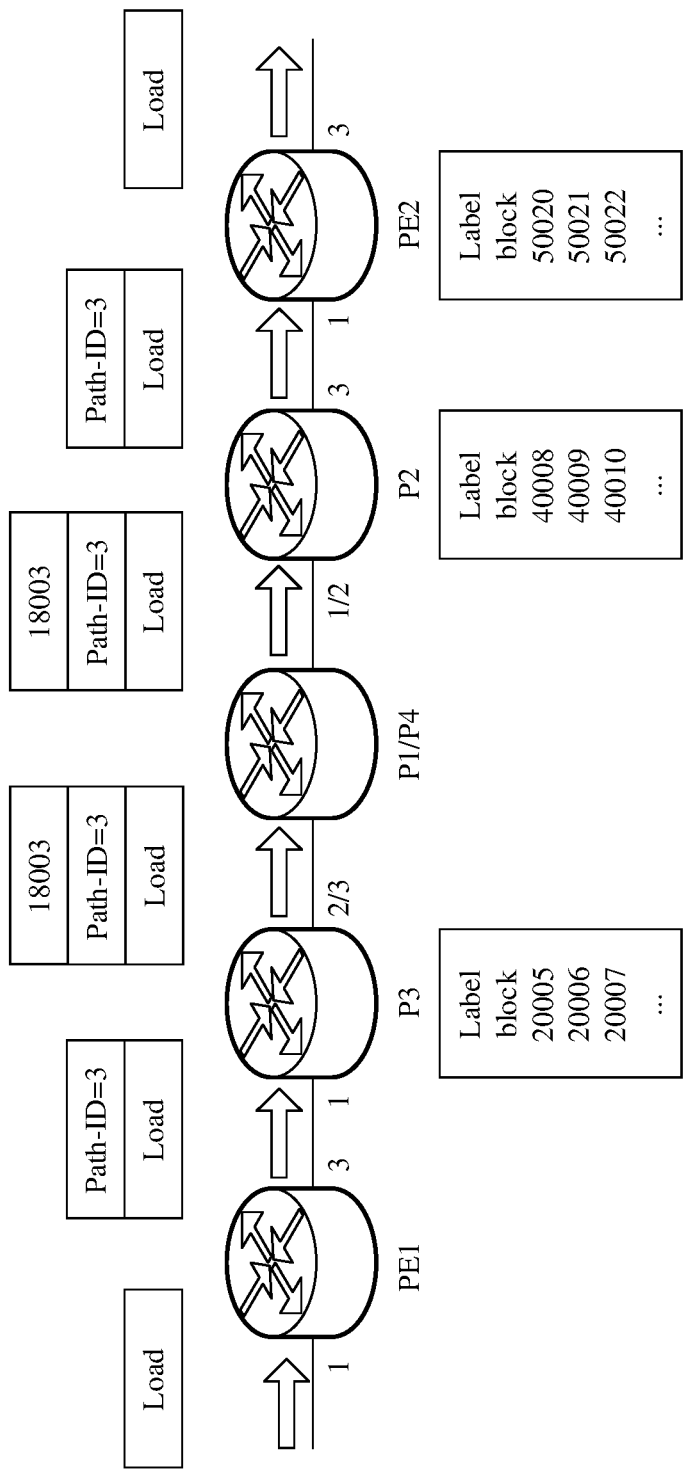
Figures 1, 5:
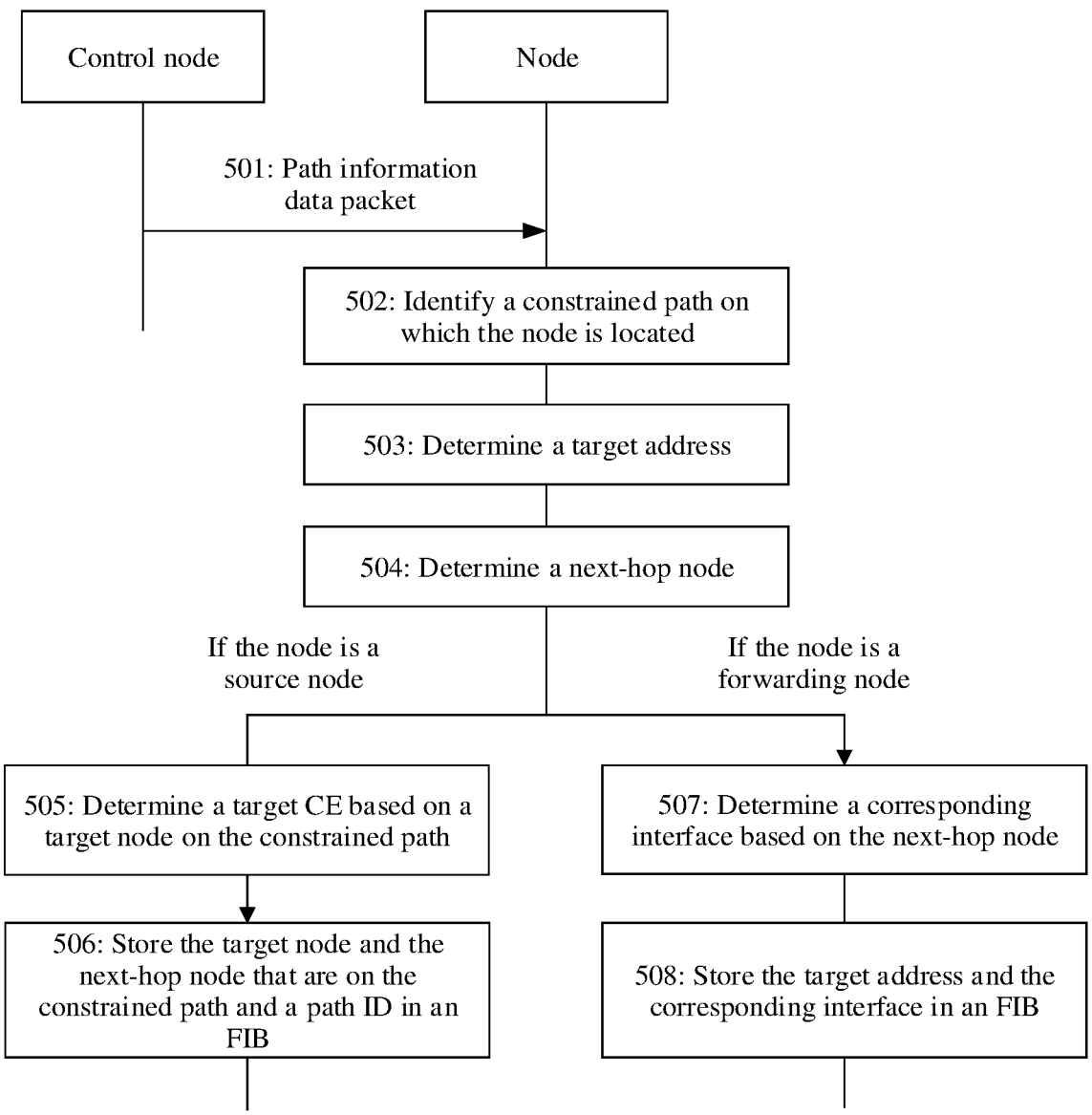
Figures 2, 5:
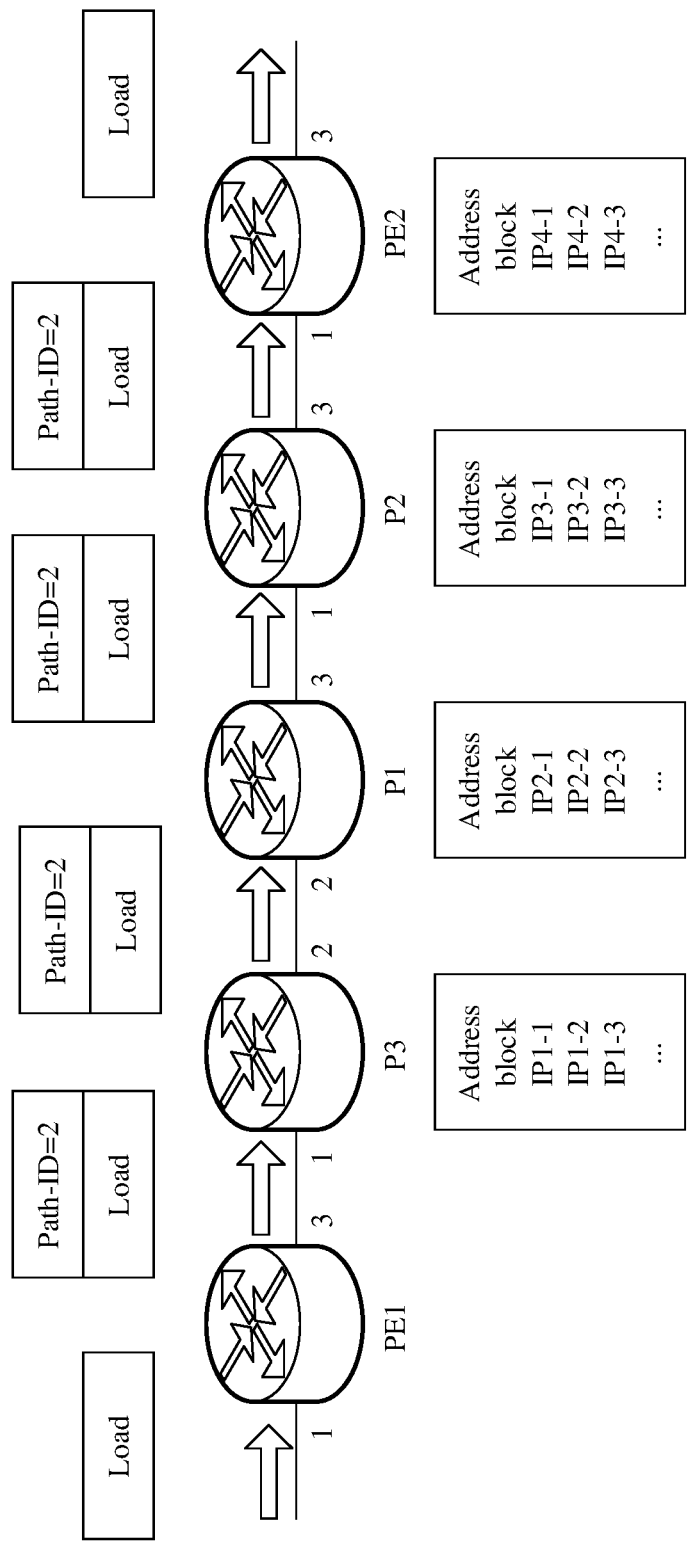
Figures 3, 5:
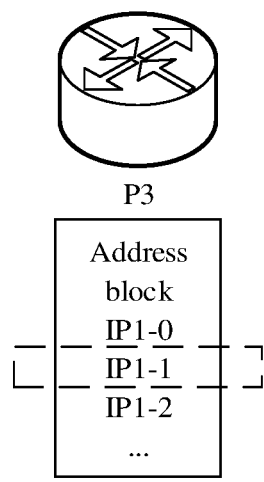
Figure 6:
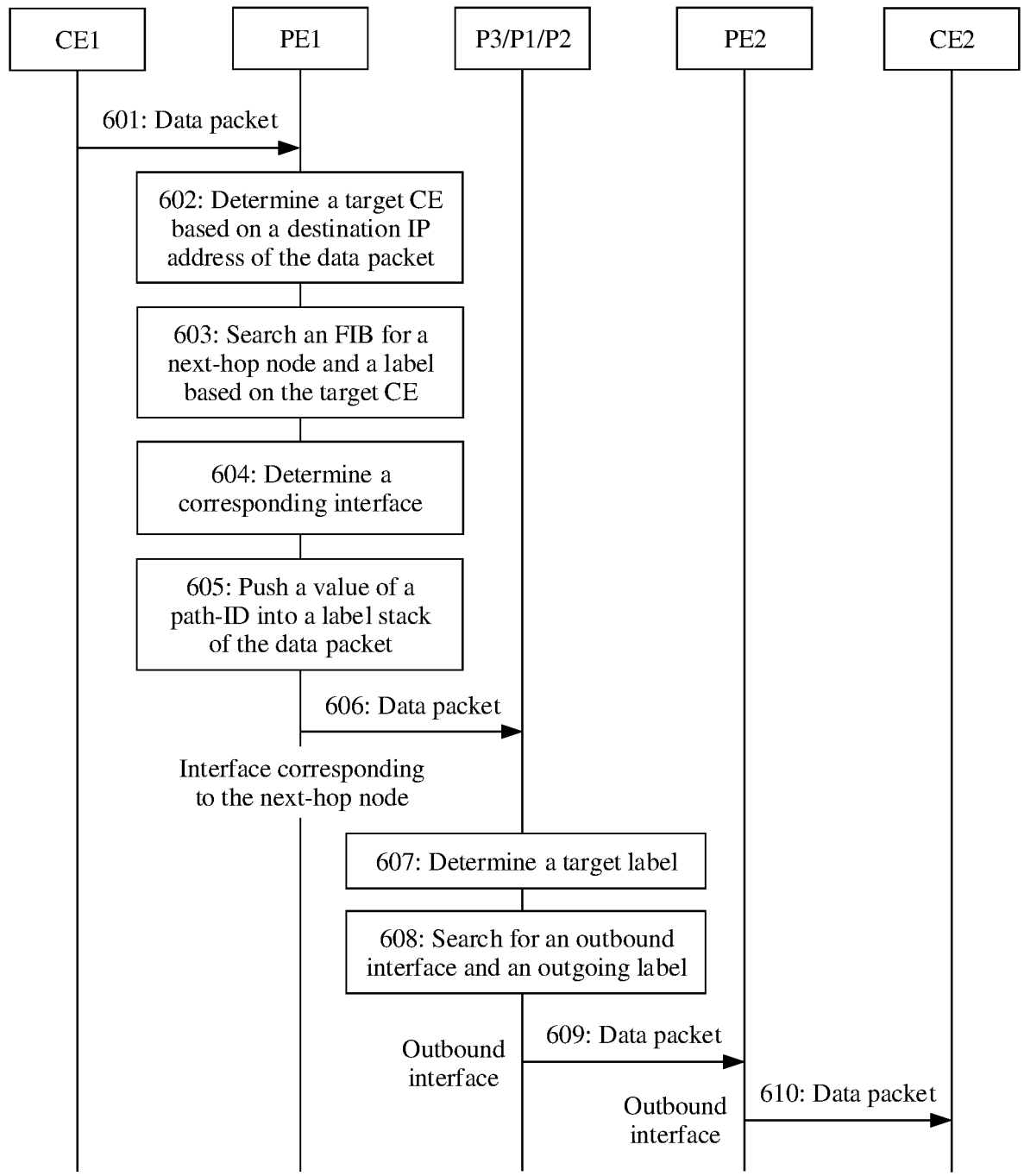
Figures 1A, 7:
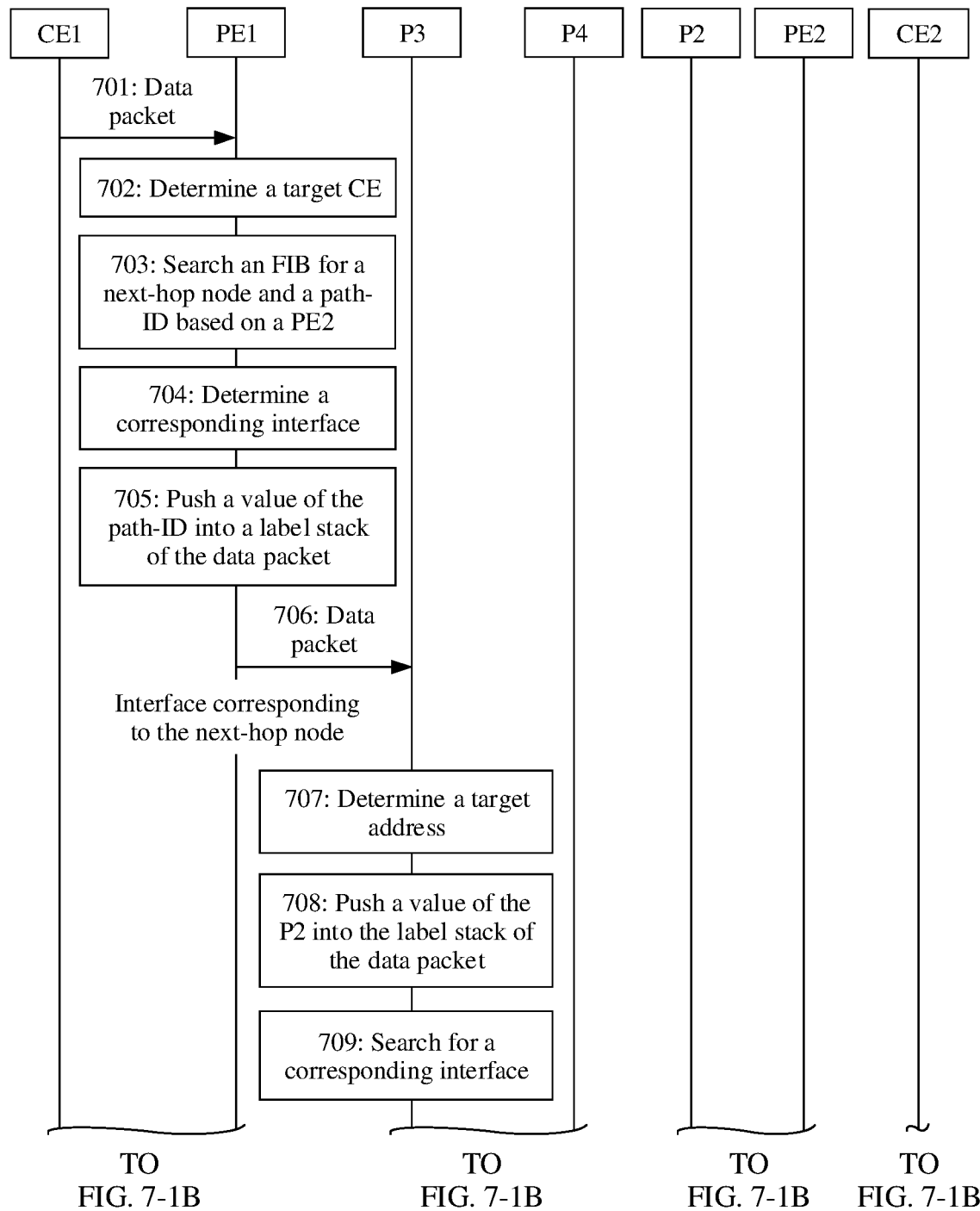
Figures 1B, 7:
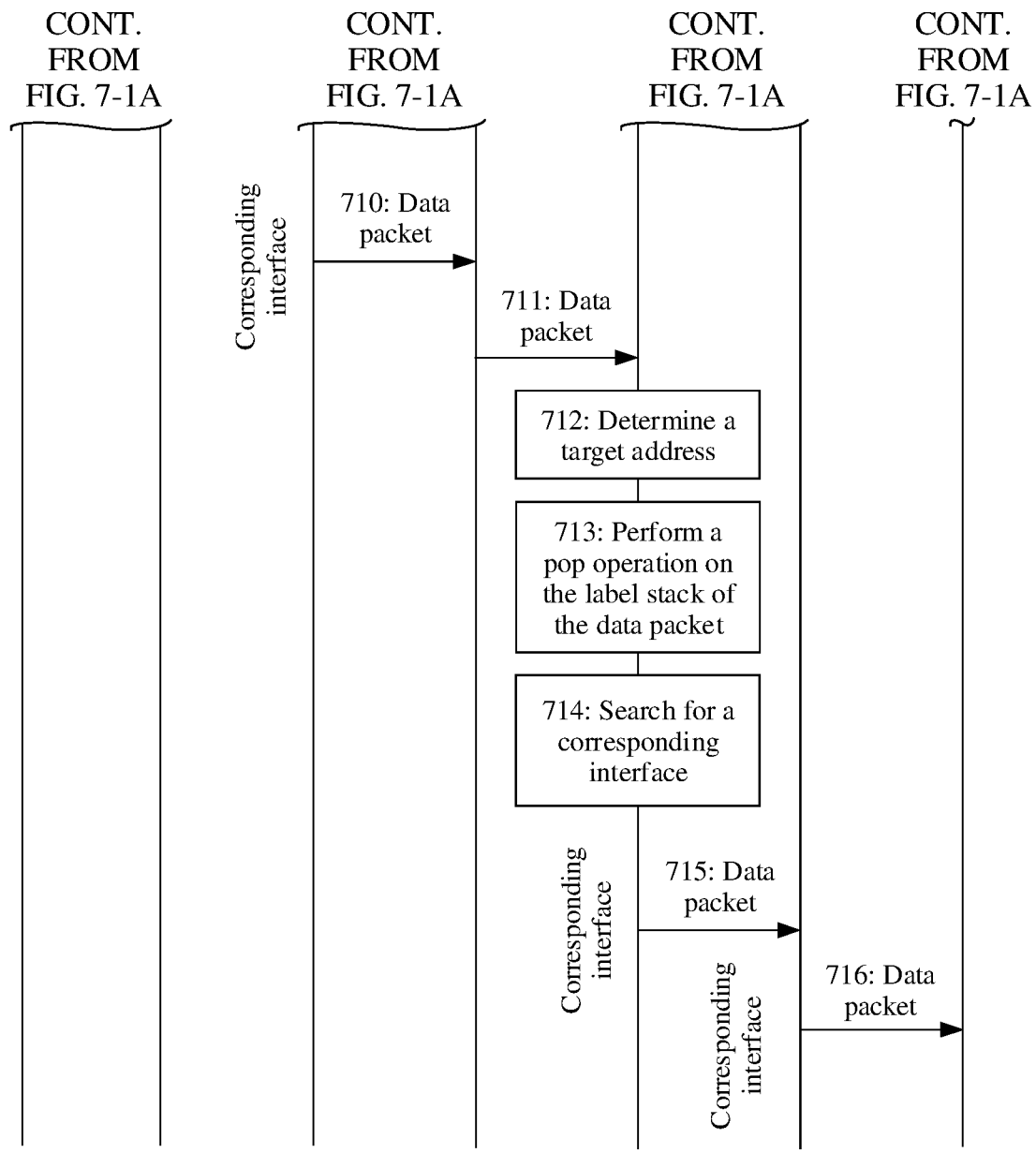
Figures 2, 7:
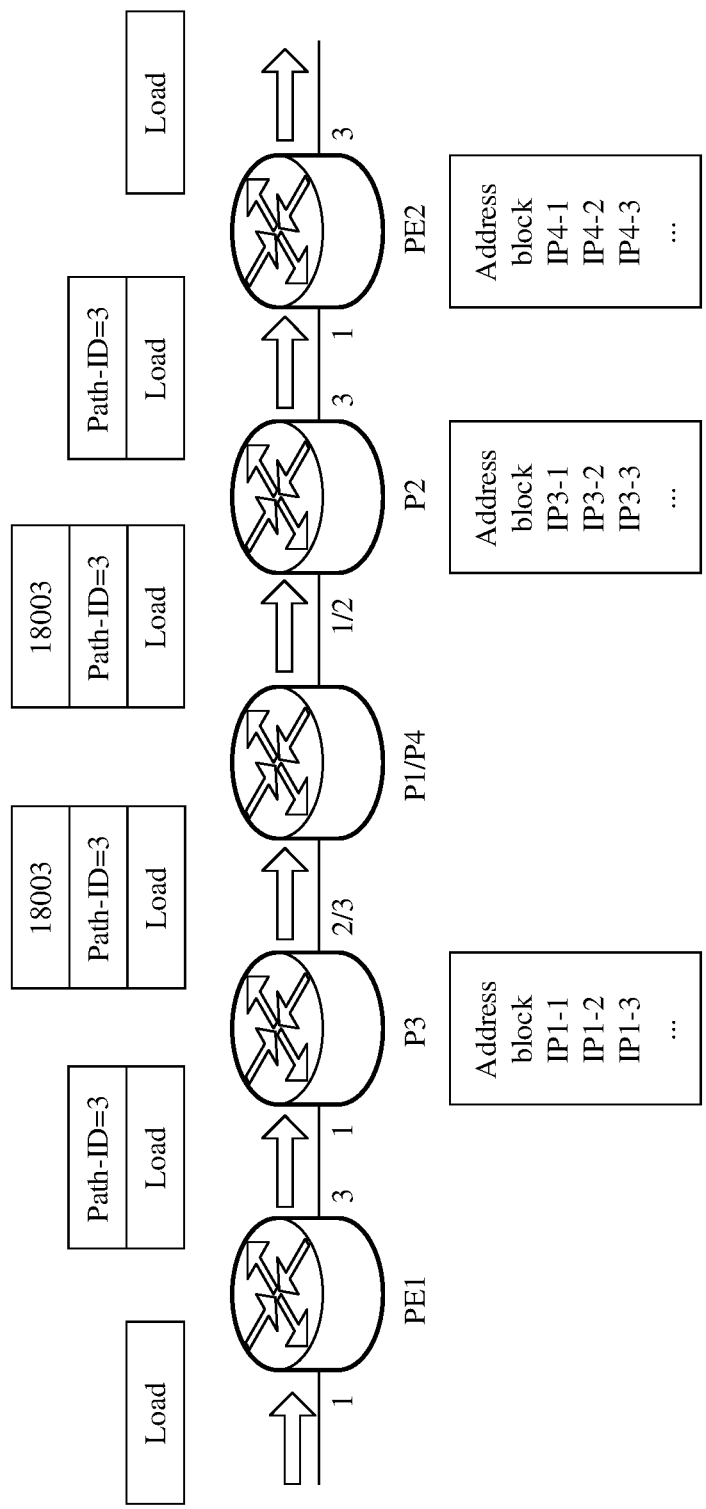

FIG. 4-1A and FIG. 4-1B show a data transmission method, including the following steps.

401: The PE1 receives a data packet sent by a CE1.

402: The PE1 determines a target CE based on a destination IP address of the data packet.

Steps 401 and 402 are the same as steps 301 and 302, and details are not described herein again.

403: The PE1 searches an FIB for a next-hop node and a label based on the target CE.

In this embodiment of this application, the PE1 may query entries in the FIB based on the PE2, to obtain the entries shown in Table 5. In this case, the PE1 may determine, based on the entries, that the next-hop node is the P3 and the label is 3.

404: The PE1 determines a corresponding interface based on the next-hop node.

Step 404 is the same as step 304, and details are not described herein again.

405: The PE1 pushes Path-ID=3 into a label stack of the data packet.

In this embodiment of this application, before the PE1 sends the data packet, the PE1 pushes Path-ID=3 into the label stack of the data packet, to obtain a structure of the data packet shown in the following table.

TABLE 12

| Path-ID = 3 |
| --- |
| Load |

406: The PE1 sends the data packet to the P3 through an interface 3.

In this embodiment of this application, after pushing the Path-ID=3, the PE1 may send the data packet to the P3 through the interface 3.

407: The P3 determines, as a target label, an MPLS label from a local available label block based on Path-ID=3 and according to a preset rule.

In this embodiment of this application, the P3 identifies, by viewing the bottom of the label stack of the data packet, that Path-ID=3, and then determines, as the target label, the MPLS label from the local available label block according to the preset rule. In some possible implementations, the preset rule may be selecting, as the target label, the third MPLS label from at least one local available MPLS label in a preset order by using a value of the path-ID as an offset X, that is, X=3. For example, the preset order is ascending order. Assuming that local available MPLS labels of the P3 are 20005, 20006, 20007, ..., the third MPLS label is 20007 in ascending order, that is, the target label is 20007. In some possible implementations, assuming that the local available MPLS labels of the P3 are 19001, 20005, 20006, ..., the third MPLS label is 20006 in ascending order, that is, the target label is 20006. In some possible implementations, the preset order may be alternatively descending order, and this is not limited herein. In this embodiment of this application, an example in which the target label of the P3 is 20007 is used for description.

Because a manner of determining the target label by the P3 is the same as a manner of determining the target label by the PE1, the same target label may be determined in the same manner. Therefore, using Path-ID=3 as an identifier of the constrained path, the data packet may need to carry a value of only the path-ID, and all forwarding nodes do not need to have a same local available MPLS label. This avoids a case in which all the forwarding nodes do not have a same local available MPLS label.

408: The P3 pushes an identifier of the P2 into the data packet.

After determining the target label 20007, the P3 may search, based on the identifier 20007, the LFIB shown in Table 6 for a corresponding outbound interface, to obtain that the outbound interface is the interface 3 and an outgoing label is 3. It should be noted that the outbound interface is an interface through which the data packet is sent. After determining that the outbound interface is the interface 3, where the interface 3 corresponds to a P4, the P3 may send the data packet to the P4 through the interface 3. Because the next-hop node P2 and the P3 are not neighbor nodes, the P3 needs to push an identifier 18003 of the P2, to obtain the following table.

TABLE 13

| 18003 |
| --- |
| Path-ID = 3 |
| Load |

409: The P3 searches the LFIB for an outbound interface and an outgoing label that correspond to Path-ID=3.

In this embodiment of this application, the forwarding node P3 may determine the corresponding interface based on the next-hop node P2. Because the next-hop node of the P3 is the P2 but the P2 is not a neighbor node of the P3, the P3 may select a path from paths from the P3 to the P2, that is, P3->P1->P2 or P3->P4->P2. If the P3 selects the first path, the outbound interface corresponds to the interface 2, or if the P3 selects the second path, the outbound interface corresponds to the interface 3. In some possible implementations, a comparatively "idle" interface may be selected from the interface 1 and the interface 2 as the outbound interface. This is not limited herein. In some possible implementations, the P3 may not perform selection, but use the interface 3 shown in Table 6 in step 207 as the outbound interface corresponding to the target label. This is not limited herein.

410: The P3 forwards the data packet to the P4 through the interface 3.

After the P3 pushes the identifier of the P2 into the data packet, the P3 may forward the data packet to the P1 through the interface 2. It should be noted that the data packet still retains the structure shown in Table 10.

411: The P4 sends the data packet to the P2.

In this embodiment of this application, after receiving the data packet shown in Table 13, the P1 may obtain that Path-ID=3, and determine whether the P1 is on the constrained path whose path-ID is 3. Because the P4 is not on the constrained path whose path-ID is 3, the P4 only needs to forward the data packet based on the identifier 18003 at the top of a stack of the data packet. The P4 determines that 18003 is the identifier of the P2, and the P2 is a neighbor node of the P1. The P4 determines an interface 2 based on the P2, and the P4 forwards the data packet to the P2 through the interface 2. In some possible implementations, if the P2 is not a neighbor node of the P4, the P4 may select an interface from a plurality of interfaces according to a shortest path principle or a load balancing principle, and send the data packet by using the P2 as a target node. Details are not described herein.

412: The P2 determines, as the target label, an MPLS label from a local available label block based on Path-ID=3 and according to the preset rule.

In this embodiment of this application, after receiving the data packet, the P2 obtains, from the data packet, that Path-ID=3, and identifies whether the P2 is a forwarding node on the constrained path whose path-ID is 3. If the P2 is a forwarding node on the constrained path whose path-ID is 3, the P2 determines the MPLS label from the local available label block based on Path-ID=3 and according to the preset rule. In this embodiment of this application, the P2 identifies, by viewing the bottom of the label stack of the data packet, that Path-ID=3, and then determines, as the target label, the MPLS label from the local available label block according to the preset rule. In some possible implementations, the preset rule may be selecting, as the target label, the third MPLS label from at least one local available MPLS label in a preset order by using a value of the path-ID as an offset X, that is, X=3. For example, the preset order is ascending order. Assuming that the local available MPLS labels of the P3 are 40008, 40009, 40010, . . . , the third MPLS label is 40010 in ascending order, that is, the target label is 40010.

Because a manner of determining the target label by the P3 is the same as a manner of determining the target label by the PE1, the same target label may be determined in the same manner. Therefore, using Path-ID=3 as an identifier of the constrained path, the data packet may need to carry a value of only the path-ID, and all forwarding nodes do not need to have a same local available MPLS label. This avoids a case in which all the forwarding nodes do not have a same local available MPLS label.

413: The P2 performs a pop operation on the label stack of the data packet.

In this embodiment of this application, as shown in FIG. 4-2 (FIG. 4-2 is another schematic diagram of a transmission process of a data packet), the P2 may pop out 18003 from the label stack of the data packet, to obtain a structure of the data packet shown in Table 12.

414: The P2 searches an LFIB for an outbound interface and an outgoing label that correspond to Path-ID=3.

As shown in FIG. 4-2, the third available MPLS label is 40010 and is used as the target label, and then the P2 searches the LFIB for the outbound interface and the outgoing label that correspond to Path-ID=3. As shown in Table 8, it is obtained that the outbound interface is the interface 3, and the outgoing label is Path-ID=3.

415: The P2 sends the data packet to the PE2 through the outbound interface.

After determining the outbound interface, P2 may send the data packet to the PE2 through the outbound interface.

416: The PE2 sends the data packet to the CE2.

After receiving the data packet, as shown in the LFIB in Table 9, the PE2 pops out Path-ID=3 from the label stack of the data packet by performing a pop operation (POP), so that the structure of the data packet is shown in Table 11, and sends the data packet to the CE2 from the interface 1 shown in Table 9, so that the CE2 sends the data packet to a user terminal.

In some feasible embodiments, the node in the network may not necessarily use the MPLS technology, and may use a non-MPLS technology, for example, an IPv6 technology. The following uses the IPv6 technology as an example to describe this application.

Embodiment 2: IPv6 Technology

This embodiment of this application is divided into two parts. Part one is used to describe setting of each node in a network, and part two is used to describe transmission and reception of a data packet between nodes in the network after setting.

Figures 2, 3, 4, 5:
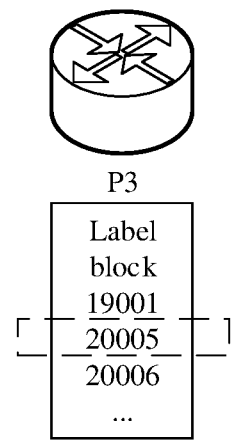

Part one: FIG. 5-1 shows a method for setting each node in a network. The method includes the following steps.

501: A control node sends a path information data packet to a node.

502: The node identifies a constrained path on which the node is located.

Steps 501 and 502 are the same as steps 201 and 202, and details are not described herein again.

503: The node determines a target address corresponding to a path-ID.

It should be noted that the address described in this embodiment of this application is a local storage address and is a 32-bit binary value. Each node may select an address as the target address of a constrained path from an address block according to a preset rule.

In some possible implementations, the preset rule may be selecting, as the target address, the $X^{th}$ address from at least one local available address in a preset order by using a value of the path-ID as an offset X. Specifically, the preset order is an order of label/address values arranged in ascending order. In some possible implementations, the preset order may be alternatively an order of label/address values arranged in descending order or in another order, and this is not limited herein. In this embodiment of this application, if the offset X=2, the preset rule may be selecting, as the target address, the second address from the address block in ascending order. If the offset X=3, the preset rule may be selecting, as the target address, the third address from the address block in ascending order.

As shown in FIG. 5-2 (FIG. 5-2 is another schematic diagram of a data packet), assuming that at least one address in an address block of the P3 is arranged in ascending order as IP1-1, IP1-2, IP1-3, . . . , local available local addresses of the P1 are arranged in ascending order as IP2-1, IP2-2, IP2-3, . . . , local available local addresses of the P2 are arranged in ascending order as IP3-1, IP3-2, IP3-3, . . . , and local available local address blocks of the PE2 are arranged in ascending order as IP4-1, IP4-2, IP4-3, . . . , the second address is IP3-2, and based on Path-ID=2, that is, offset X=2, the second address of the P2 is IP1-2, the second address of the P1 is IP2-2, the second address of the P2 is IP3-2, and the second address of the PE2 is IP4-2. According to Path-ID=3, that is, offset X=3, the third address of the P2 is IP1-3, the third address of the P1 is IP2-3, the third address of the P2 is IP3-3, and the third address of the PE2 is IP4-3.

It should be noted that the local available address is dynamic and may be updated at any time. For example, in the local addresses of the P3, an identifier IP1-0 is originally unavailable. After the P3 allocates the address IP1-2 to the constrained path whose path-ID is 2, the identifier IP1-0 may be idle and becomes available. As shown in FIG. 5-3 (FIG. 5-3 is a schematic diagram of the available addresses of the P3), the P3 may reallocate an address to the constrained path whose path-ID is 2. The P3 selects the second MPLS label, that is, IP1-1, from the at least one local available address in ascending order according to the same preset rule.

504: The node determines a next-hop node based on the constrained path, where the next-hop node is a next node of the node on the constrained path.

505: A source node determines a target CE based on a target node on the constrained path.

506: The source node stores the target CE and the next-hop node that are on the constrained path, and the path-ID in an FIB.

507: The forwarding node determines a corresponding interface based on the next-hop node.

Steps 504 to 507 are the same as steps 204 to 207, and details are not described herein again.

508. The forwarding node stores the target address and the corresponding interface in the FIB.

In this embodiment of this application, the forwarding nodes P3, P1, and P2 each may store the target address and the corresponding interface in the FIB, to obtain the FIB of the P3.

TABLE 14

| FIB of the P3 | |
|---|---|
| Target address | Interface |
| IP1-2 | Interface 2 |
| IP1-3 | Interface 3 |

It should be noted that, on the constrained path whose path-ID is 3, the interface of the P3 may be the interface 2 or the interface 3. In this embodiment of this application, the interface 3 is used as an example for description. An FIB of the P1 is as follows.

TABLE 15

| FIB of the P1 | |
|---|---|
| Target address | Interface |
| IP2-1 | Interface 3 |

It should be noted that, in this embodiment of this application, the P1 is on the constrained path whose path-ID is 2 but is not on the constrained path whose path-ID is 3. Therefore, only one entry is shown herein. An FIB of the P2 is as follows.

TABLE 16

| FIB of the P2 | |
|---|---|
| Target address | Interface |
| IP3-2 | Interface 3 |
| IP3-3 | Interface 3 |

An FIB of the PE2 is as follows.

TABLE 17

| FIB of the PE2 | |
|---|---|
| Target address | Interface |
| IP4-2 | Interface 1 |
| IP4-3 | Interface 1 |

According to steps 501 to 508 in part one, each node on the constrained path extracts and stores information from a constrained path list in the path information data packet. The following separately uses steps 601 to 610 and the constrained path (PE1->P3->P1->P2->PE2) whose path-ID is 2, and steps 701 to 715 and the constrained path (PE1->P3->P2->PE2) whose path-ID is 3 in part two as examples for description.

Figures 2, 3, 4, 5, 6:
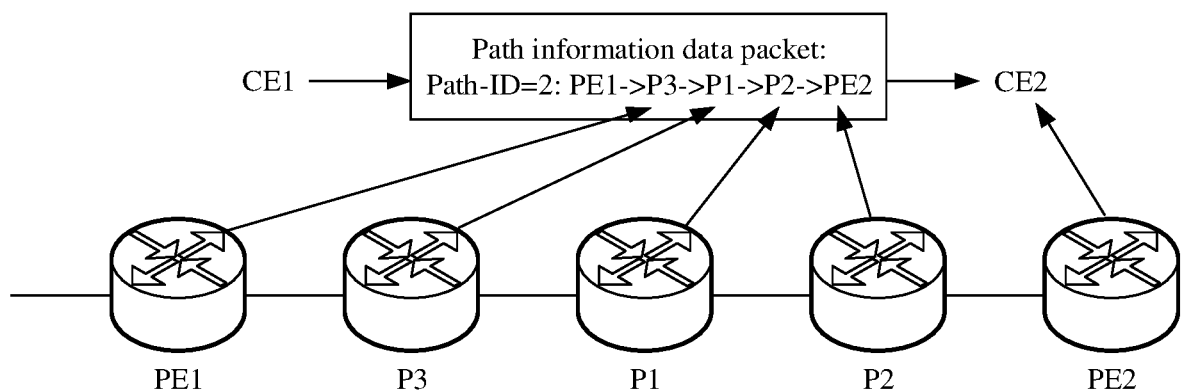

Part two: FIG. 6 shows a data transmission method, including the following steps.

1. Strictly Constrained Path

601: The PE1 receives a data packet.

602: The PE1 determines a target CE based on a destination IP address of the data packet.

603: The PE1 searches an FIB for a next-hop node and an address based on the target CE.

604: The PE1 determines a corresponding interface based on the next-hop node P3.

605: The PE1 pushes Path-ID=2 into a label stack of the data packet.

606: The PE1 sends the data packet to the P3 through an interface 3.

Steps 601 to 606 are the same as steps 301 to 306, and details are not described herein again.

607: The P3 determines, a target address, an address from a local available address block based on Path-ID=2 and according to a preset rule.

In this embodiment of this application, the P3 identifies, by viewing the bottom of the label stack of the data packet, that Path-ID=2, and then determines, as the target address, the address from the local available address block according to the preset rule. In some possible implementations, the preset rule may be selecting, as the target address, the second address from at least one local available address in a preset order by using a value of the path-ID as an offset X, that is, X=2. For example, the preset order is ascending order. Assuming that the local available addresses of the P3 are IP1-1, IP1-2, IP1-3, . . . , the second address is IP1-2 in ascending order, that is, the target address is IP1-2. In some possible implementations, assuming that the local available addresses of the P3 are 19001, IP1-1, IP1-2, . . . , the second address is IP1-1 in ascending order, that is, the target address is IP1-1. In some possible implementations, the preset order may be alternatively descending order, and this is not limited herein. In this embodiment of this application, an example in which the target address of the P3 is IP1-2 is used for description.

Because a manner of determining the target address by the P3 is the same as a manner of determining the target address by the PE1, the same target address may be determined in the same manner. Therefore, using Path-ID=2 as an identifier of the constrained path, the data packet may need to carry a value of only the path-ID, and all forwarding nodes do not need to have a same local available address. This avoids a case in which all the forwarding nodes do not have a same local available address.

608: The P3 searches an FIB for an interface corresponding to the identifier IP1-2.

After determining the target address IP1-2, the P3 may search, based on the identifier IP1-2, the FIB shown in Table 6 for the corresponding interface, to obtain that the interface is the interface 2. It should be noted that the corresponding interface is an interface through which the data packet is sent. After determining that the corresponding interface is the interface 2, where the interface 2 corresponds to the P1, the P3 may send the data packet to the P1 through the interface 2.

609: The P3 forwards the data packet to the P1 through the interface 2.

Step 609 is the same as step 309, and details are not described herein again.

610: The PE2 sends the data packet to the CE2.

After receiving the data packet, as shown the FIB in Table 9, the PE2 obtains the load in the data packet, and sends, to the CE2, the data packet on which a pop operation is performed, so that the CE2 sends the data packet to a user terminal.

1. Loosely Constrained Path

It should be noted that the strictly constrained path may be considered as a special case of the loosely constrained path.

Figures 2, 3, 4, 5, 6, 7:
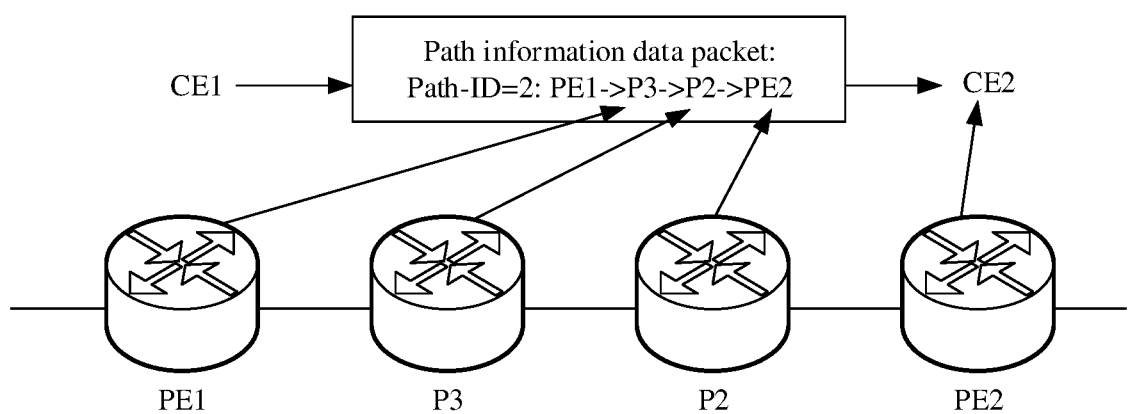
Figures 1, 3:
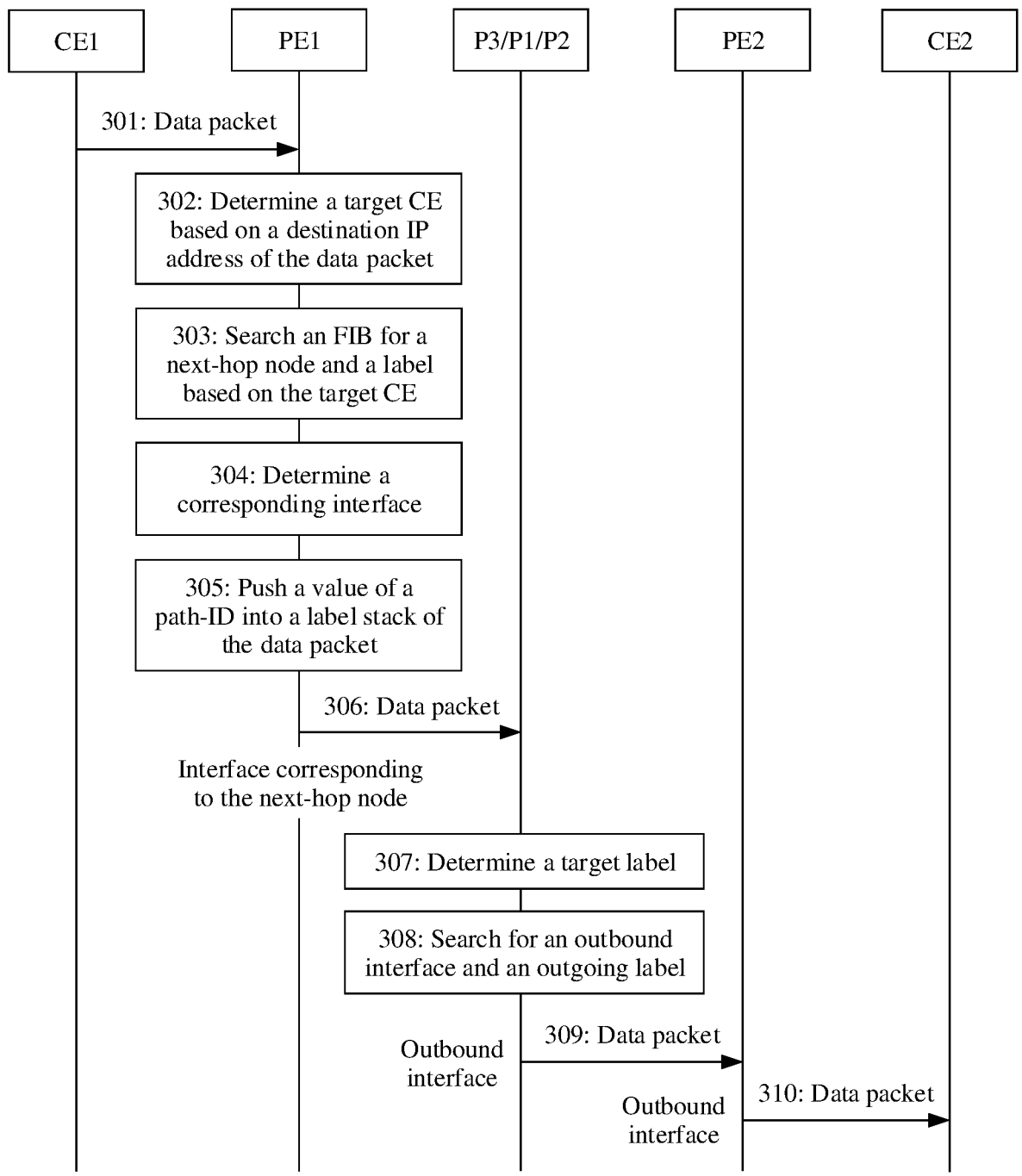
Figures 2, 3:
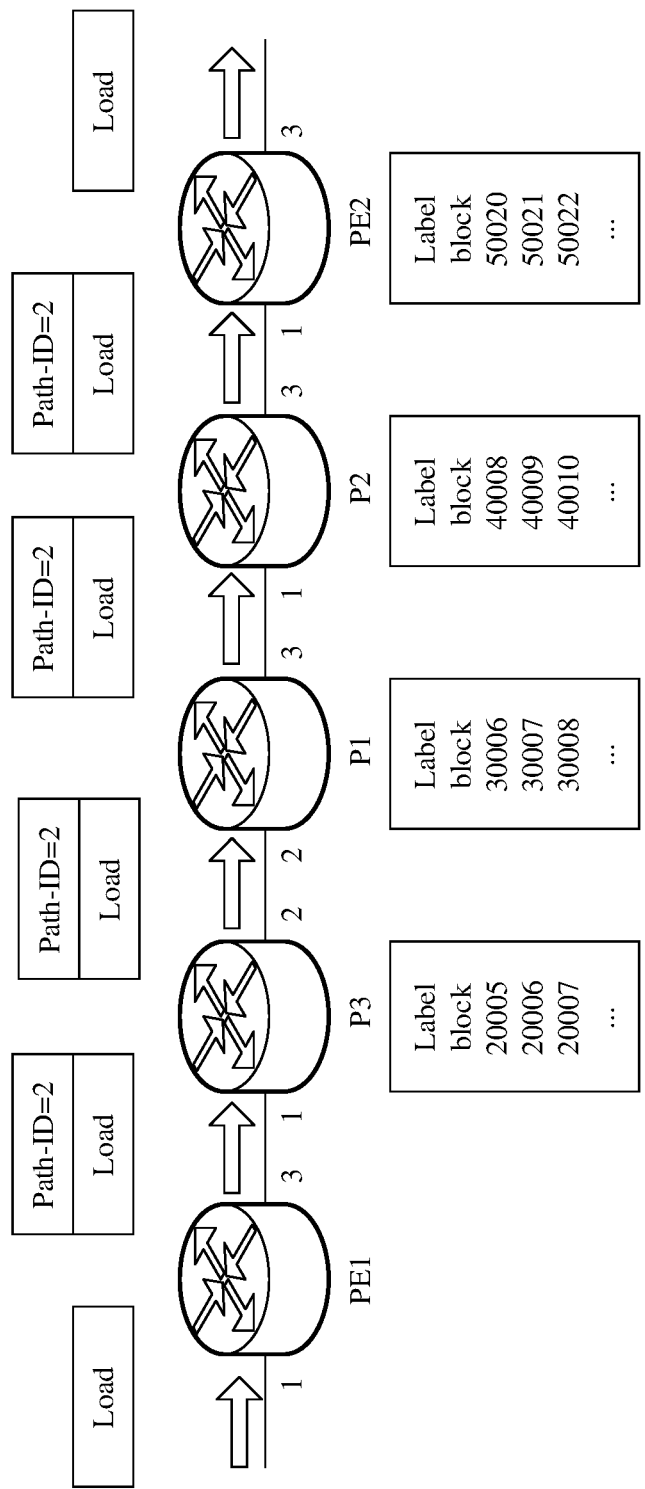

FIG. 7-1A and FIG. 7-1B show a data transmission method, including the following steps.

701: A CE1 sends a data packet to the PE1.

702: The PE1 determines a target CE based on a destination IP address of the data packet.

703: The PE1 searches an FIB for a next-hop node and an address based on the target CE.

704: The PE1 determines a corresponding interface based on the next-hop node P3.

705: The PE1 pushes Path-ID=3 into a label stack of the data packet.

706: The PE1 sends the data packet to the P3 through an interface 3.

Steps 701 to 706 are the same as steps 401 to 406, and details are not described herein again.

707: The P3 determines, as a target address, an address from a local available address block based on Path-ID=3 and according to a preset rule.

In this embodiment of this application, the P3 identifies, by viewing the bottom of the label stack of the data packet, that Path-ID=3, and then determines, as the target address, the address from the local available address block according to the preset rule. In some possible implementations, the preset rule may be selecting, as the target address, the third address from at least one local available address in a preset order by using a value of the path-ID as an offset X, that is, X=3. For example, the preset order is ascending order. Assuming that local available addresses of the P3 are IP1-1, IP1-2, IP1-3, . . . , the third address is IP1-3 in ascending order, that is, the target address is IP1-3. In some possible implementations, assuming that local available addresses of the P3 are 19001, IP1-1, IP1-2, . . . , the third address is IP1-2 in ascending order, that is, the target address is IP1-2. In some possible implementations, the preset order may be alternatively descending order, and this is not limited herein. In this embodiment of this application, an example in which the target address of the P3 is IP1-3 is used for description.

Because a manner of determining the target address by the P3 is the same as a manner of determining the target address by the PE1, the same target address may be determined in the same manner. Therefore, using Path-ID=3 as an identifier of the constrained path, the data packet may need to carry a value of only the path-ID, and all forwarding nodes do not need to have a same local available address. This avoids a case in which all the forwarding nodes do not have a same local available address.

708: The P3 pushes an identifier of the P2 into the data packet.

After determining the target address IP1-3, the P3 may search, based on the identifier IP1-3, the FIB shown in Table 6 for a corresponding interface, to obtain that the interface is the interface 3 and an outgoing address is 3. It should be noted that the interface is an interface through which the data packet is sent. After determining that the interface is the interface 3, where the interface 3 corresponds to a P4, the P3 may send the data packet to the P4 through the interface 3. Because the next-hop node P2 and the P3 are not neighbor nodes, the P3 needs to push a node identifier P2 of the P2, to obtain the following table.

TABLE 18

| IP-P2 |
| Path-ID = 3 |
| Load |

709: The P3 searches an LFIB for an interface corresponding to Path-ID=3.

In this embodiment of this application, the forwarding node P3 may determine the corresponding interface based on the next-hop node P2. Because the next-hop node of the P3 is the P2 but the P2 is not a neighbor node of the P3, the P3 may select a path from paths from the P3 to the P2, that is, P3->P1->P2 or P3->P4->P2. If the P3 selects the first path, the interface corresponds to the interface 2, or if the P3 selects the second path, the interface corresponds to the interface 3. In some possible implementations, a comparatively "idle" interface may be selected from the interface 1 and the interface 2. This is not limited herein. In some possible implementations, the P3 may not perform selection, but use the interface 3 determined in step 607 as the interface corresponding to the target label. This is not limited herein.

710: The P3 forwards the data packet to the P4 through the interface 3.

711: The P4 sends the data packet to a CE2.

Steps 709 to 711 are the same as steps 409 to 411, and details are not described herein again.

712: The P2 determines, as the target address, an address from a local available address block based on Path-ID=3 and according to the preset rule.

In this embodiment of this application, after receiving the data packet, the P2 obtains, from the data packet, that Path-ID=3, and identifies whether the P2 is a forwarding node on the constrained path whose path-ID is 3. If the P2 is a forwarding node on the constrained path whose path-ID is 3, the P2 determines the target address from the local available label block based on Path-ID=3 and according to the preset rule. In this embodiment of this application, the P2 identifies, by viewing the bottom of the label stack of the data packet, that Path-ID=3, and then determines the target address from the local available address block according to the preset rule. In some possible implementations, the preset rule may be selecting, as the target address, the third address from the at least one local available target address in a preset order by using a value of the path-ID as an offset X, that is, X=3. For example, the preset order is ascending order. As shown in FIG. 7-2 (FIG. 7-2 is a schematic diagram of a transmission process of a data packet), assuming that local available addresses of the P3 are IP3-1, IP3-2, IP3-3, . . . , the third address is IP3-3 in ascending order, that is, the target label is IP3-3.

Because a manner of determining the target label by the P3 is the same as a manner of determining the target label by the PE1, the same target label may be determined in the same manner. Therefore, using Path-ID=3 as an identifier of the constrained path, the data packet may need to carry a value of only the path-ID, and all forwarding nodes do not need to have a same local available address. This avoids a case in which all the forwarding nodes do not have a same local available address.

713: The P2 performs a pop operation on the label stack of the data packet.

In this embodiment of this application, as shown in FIG. 7-2, the P2 may pop out 18003 from the label stack of the data packet, and obtain the structure of the data packet shown in Table 12.

714: The P2 searches an FIB for an interface corresponding to Path-ID=3.

As shown in FIG. 7-2, the third available MPLS label is IP3-3 and is used as the target label, and then the P2 searches the FIB for the interface corresponding to Path-ID=3. As shown in Table 8, it is obtained that the interface is the interface 3.

715: The P2 sends the data packet to the PE2 through the corresponding interface.

716: The P2 sends the data packet to the PE2 through the corresponding interface.

After receiving the data packet, the PE2 queries the FIB shown in Table 17, and sends the data packet to the CE2 from the interface 1, so that the CE2 sends the data packet to a user terminal.

By performing the foregoing method steps, when the forwarding node receives the data packet, the forwarding node may determine the target address from the local available address block based on the path-ID in the label stack of the data packet and according to the preset rule, search for the outbound interface corresponding to the target address, and forward the data packet through the outbound interface. Therefore, in the network transmission process of the data packet, forwarding nodes are not required to have a same local available address. This avoids a case in which all the forwarding nodes do not have a common local available address.

Figure 8:
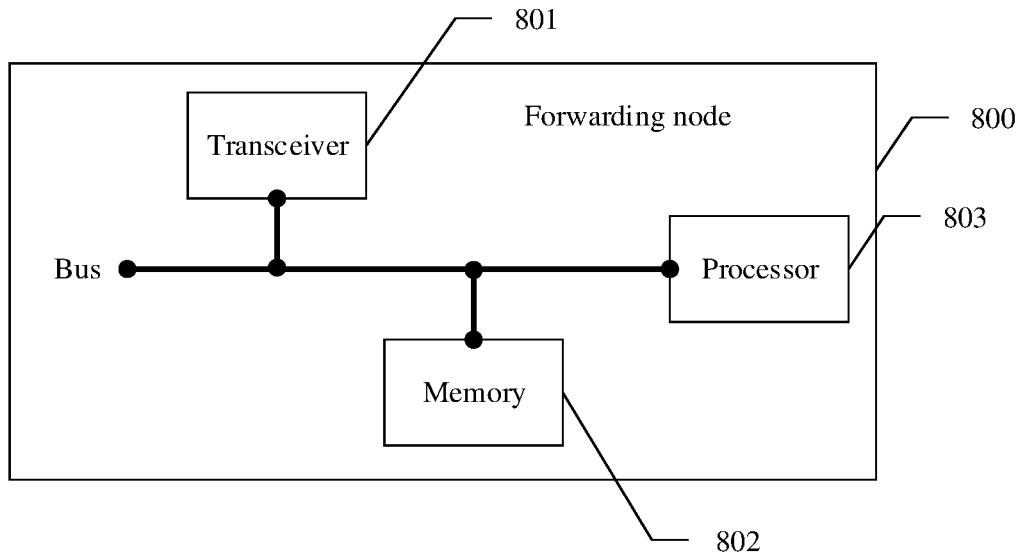

The foregoing describes this application from a perspective of the method. The following describes this application from a perspective of a device. Referring to FIG. 8, this application provides a forwarding node 800, including a transceiver 801, a memory 802, and a processor 803.

The processor 803 is configured to execute a computer-readable instruction in the memory 802, to perform the following operations: receiving a data packet, where a label stack of the data packet includes a path identifier path-ID, the path-ID is an identifier of a constrained path, and the constrained path is a path that consists of at least two nodes arranged in a specific order, determining that the forwarding node is a node on the constrained path, selecting a target label/target address from a local available label block/address block based on the path-ID and according to a preset rule, where the label block/address block includes at least one label/address, searching for a corresponding target interface based on the target label/target address, and forwarding the data packet through the target interface.

In some possible implementations, the preset rule is selecting, as the target label/target address, the $X^{th}$ label/address from the label block/address block in a preset order by using a value of the path-ID as an offset X. A same target label/target address may be obtained through calculation based on a same path-ID and according to a same preset rule. Therefore, it is not required that all nodes use the same target label/target address to represent the constrained path.

In some possible implementations, the preset order is an order of label/address values arranged in ascending order, and this provides higher feasibility and less execution difficulty.

In some possible implementations, the processor 803 is further configured to receive a path information data packet, where the path information data packet includes the constrained path and the path-ID, determine a next-hop node based on the constrained path, where the next-hop node is a next node of the forwarding node on the constrained path, determine the target interface based on the next-hop node, select the target label/target address from the label block/address block based on the path-ID and according to the preset rule, and store the target tag/target address and the target interface in a corresponding manner.

For information about the constrained path, only information about the next-hop node is extracted to determine the target interface, and the target label/target address and the target interface are stored. Therefore, the information about the entire constrained path does not need to be stored, and this minimizes a storage requirement and also meets a characteristic that the forwarding node only forwards data but does not process data.

In some possible implementations, the label block is an MPLS label block.

In some possible implementations, the storing the target label/target address and the target interface in a corresponding manner includes storing the target label and the target interface in a target entry of a label forwarding information base LFIB in a corresponding manner, where the target label is stored in an incoming label of the target entry, and the target interface is stored in an outbound interface of the target entry.

In some possible implementations, the determining, by the forwarding node, the target interface based on the next-hop node includes determining, by the forwarding node, that the next-hop node is not a neighbor node of the forwarding node, selecting, by the forwarding node, the target interface from an interface other than an interface through which the data packet is received, and storing, by the forwarding node, an identifier of the next-hop node in an outgoing label of the target entry, and before the forwarding, by the forwarding node, the data packet through the target interface, further including pushing, by the forwarding node, the identifier of the next-hop node into the label stack of the data packet.

In the foregoing storage manner, a data storage manner in which an MPLS technology for forwarding is used, so that an existing MPLS protocol is maximally used, with a minimum change made to the protocol.

In some possible implementations, the determining the target interface based on the next-hop node includes determining that the next-hop node is a neighbor node of the forwarding node, determining an interface corresponding to the next-hop node as the target interface, and storing the path-ID in an outgoing label of the target entry.

When forwarding the data packet, the forwarding node may replace a label at the top of a stack of the data packet with the path-ID in the outgoing label. Because the label at the top of the stack of the data packet is also a path-ID, it is equivalent to keeping a same path-ID in the data packet for forwarding. In this way, a next forwarding node that receives the data packet may perform, based on the same path-ID, a same operation as that performed by a previous forwarding node.

In some possible implementations, the address block is an IP address block, and the storing the target label/target address and the target interface in a corresponding manner includes storing the target address and the target interface in a target entry of a forwarding information base FIB in a corresponding manner, where the target label is stored in an address of the target entry, and the target interface is stored in an interface of the target entry.

In the foregoing storage manner, a data storage manner in which an IPv6 technology for forwarding is used, so that an existing IPv6 protocol is maximally used, with a minimum change made to the protocol.

In some possible implementations, the determining the target interface based on the next-hop node includes determining that the next-hop node is a neighbor node of the forwarding node, and determining an interface corresponding to the next-hop node as the target interface.

For information about the constrained path, only information about the next-hop node is extracted to determine the target interface, and the target address and the target interface are stored. Therefore, the information about the entire constrained path does not need to be stored, and this minimizes a storage requirement and also meets a characteristic that the forwarding node only forwards data but does not process data.

In some possible implementations, the determining, by the forwarding node, the target interface based on the next-hop node includes determining, by the forwarding node, that the next-hop node is not a neighbor node of the forwarding node, selecting, by the forwarding node, the target interface from an interface other than an interface through which the data packet is received, and storing, by the forwarding node, an address of the next-hop node in the address of the target entry. In the foregoing storage manner, a data storage manner in which an IPv6 technology for forwarding is used, so that an existing IPv6 protocol is maximally used, with a minimum change made to the protocol.

It should be noted that the processor 803 may be a central processing unit (central processing unit, CPU), a network processor (network processor, NP), or a combination of a CPU and an NP. Alternatively, the processor 803 may be an application-specific integrated circuit (application-specific integrated circuit, ASIC), a programmable logic device (programmable logic device, PLD), or a combination of an ASIC and a PLD. The PLD may be a complex programmable logic device (complex programmable logic device, CPLD), a field programmable gate array (field-programmable gate array, FPGA), a generic array logic (generic array logic, GAL), or any combination thereof. The processor 803 may be one processor, or may include a plurality of processors. The transceiver 801 is configured to receive BGP routing information from a second network device, and send the packet to the processor 803, so as to perform subsequent operation processing. The BGP routing information includes a destination address, a next-hop address to the destination address, and attribute information. The attribute information indicates a manner in which the first network device performs route recursion processing on the next-hop address. The memory 802 may include a volatile memory, for example, a random access memory (RAM). Alternatively, the memory may include a non-volatile memory, for example, a read-only memory (ROM), a flash memory, a hard disk drive (HDD), or a solid-state drive (SSD). Alternatively, the memory may include a combination of the foregoing types of memories. The memory 802 stores a computer-readable instruction, and the computer-readable instruction includes at least one software module. After executing each software module, the processor 803 may perform a corresponding operation according to an instruction of the software module.

Figure 9:
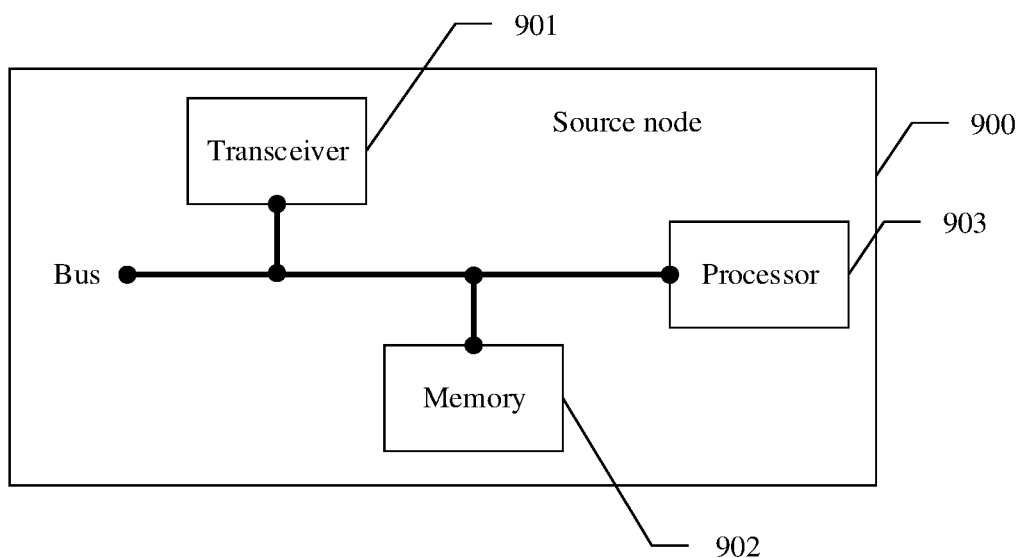

Referring to FIG. 9, this application provides a source node 900, including: a transceiver 901, a memory 902, and a processor 903.

The processor 903 is configured to execute a computer-readable instruction in the memory 902, to perform the following operations: receiving a data packet, determining a target node based on a destination IP address of the data packet, determining a path-ID and a corresponding next-hop node based on the target node, where the path-ID is an identifier of a constrained path, the constrained path is a path that consists of at least two nodes arranged in a specific order, the next-hop node is a next node of the source node on the constrained path, and the target node is a last node on the constrained path, pushing the path-ID into a label stack of the data packet, and sending the data packet to the next-hop node.

When the forwarding node receives the data packet, the forwarding node may determine a target address from a local available address block based on the path-ID in the label stack of the data packet and according to a preset rule, search for an outbound interface corresponding to the target address, and forward the data packet through the outbound interface. Therefore, in a network transmission process of the data packet, forwarding nodes are not required to have a same local available address. This avoids a case in which all the forwarding nodes do not have a common local available label.

In some possible implementations, the processor is further configured to receive, by the source node, a path information data packet, where the path information data packet includes the constrained path and the path-ID, determine, by the source node, the next-hop node and the target node based on the constrained path, determine, by the source node, the target CE based on the target node, and store, by the source node, the target CE, the next-hop node, and the path-ID in a corresponding manner.

For information about the constrained path, only information about the next-hop node is extracted to determine the target interface, and the target label/target address and the target interface are stored. Therefore, the information about the entire constrained path does not need to be stored, and this minimizes a storage requirement and also meets a characteristic that the forwarding node only forwards data but does not process data.

In some possible implementations, the determining the target interface based on the next-hop node includes determining, by the forwarding node, that the next-hop node is not a neighbor node of the forwarding node, selecting the target interface from an interface other than an interface through which the data packet is received, and storing an identifier of the next-hop node in an address of the target entry. In the foregoing storage manner, a data storage manner in which an IPv6 technology for forwarding is used, so that an existing IPv6 protocol is maximally used, with a minimum change made to the protocol.

It should be noted that the processor 903 may be a central processing unit (central processing unit, CPU), a network processor (network processor, NP), or a combination of a CPU and an NP. Alternatively, the processor 903 may be an application-specific integrated circuit (application-specific integrated circuit, ASIC), a programmable logic device (programmable logic device, PLD), or a combination of an ASIC and a PLD. The PLD may be a complex programmable logic device (complex programmable logic device, CPLD), a field programmable gate array (field-programmable gate array, FPGA), a generic array logic (generic array logic, GAL), or any combination thereof. The processor 903 may be one processor, or may include a plurality of processors. The transceiver 901 is configured to receive BGP routing information from a second network device, and send the packet to the processor 903, so as to perform subsequent operation processing. The BGP routing information includes a destination address, a next-hop address to the destination address, and attribute information. The attribute information indicates a manner in which the first network device performs route recursion processing on the next-hop address. The memory 902 may include a volatile memory, for example, a random access memory (RAM). Alternatively, the memory may include a non-volatile memory, for example, a read-only memory (ROM), a flash memory, a hard disk drive (HDD), or a solid-state drive (SSD). Alternatively, the memory may include a combination of the foregoing types of memories. The memory 902 stores a computer-readable instruction, and the computer-readable instruction includes at least one software module. After executing each software module, the processor 903 may perform a corresponding operation according to an instruction of the software module.

Figure 10:
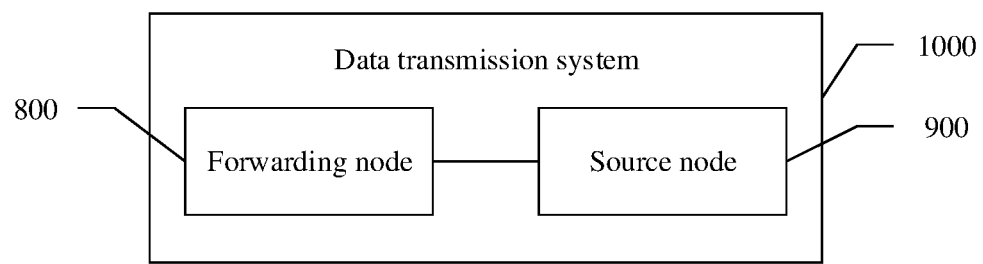

Referring to FIG. 10, this application provides a data transmission system 1000, including the forwarding node 800 and the source node 900.

When the forwarding node 800 receives a data packet from the source node 900, the forwarding node 800 may determine a target address from a local available address block based on a path-ID in a label stack of the data packet and according to a preset rule, search for an outbound interface corresponding to the target address, and forward the data packet through the outbound interface. Therefore, in a network transmission process of the data packet, forwarding nodes are not required to have a same local available address. This avoids a case in which all the forwarding nodes do not have a common local available label.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method, comprising:

receiving, by a forwarding node, a data packet, wherein a label stack of the data packet comprises a path identifier (path-ID), wherein the path-ID is an identifier of a constrained path, wherein the constrained path is a path that consists of at least two nodes arranged in a specific order, and wherein the path-ID identifies the constrained path while avoiding identifying, in the path-ID, nodes forming the constrained path;

selecting, by the forwarding node, a target label/target address from a local available label block/address block according to the path-ID and according to a preset rule, wherein the target label/target address has a value different from a value of at least one other local available label block/address block that is located, at a location in another node on the constrained path, wherein the location is a location in a local available label block/address block that is of the another node and is associated with the path-ID and the preset rule, wherein the label block/address block comprises at least one label/address, and wherein the target label/target address is a multi-protocol label switching (MPLS) label that is determined by the forwarding node and that is stored at the forwarding node in response to the forwarding node receiving a path information data packet prior to receiving the data packet, that is further stored in response to the forwarding node determining that the forwarding node is a node on the constrained path, and that is associated with the path ID and a corresponding target interface;

searching for, by the forwarding node, the corresponding target interface according to the target label/target address;

pushing, by the forwarding node, in response to a next-hop node not being a neighbor node of the forwarding node, an identifier of the next-hop node into the label stack of the data packet;

maintaining, by the forwarding node, in response to the next-hop node being a neighbor node of the forwarding node, the label stack of the data packet without an identifier of the next- hop node; and forwarding, by the forwarding node, the data packet through the target interface.

2. The method according to claim 1, wherein the preset rule comprises selecting, as the target label/target address, an $X^{th}$ label/address from the label block/address block in a preset order using a value of the path-ID as an offset X, wherein the preset order is an order of label/address values arranged in ascending order.

3. The method according to claim 1, further comprising performing, before the receiving the data packet:

receiving, by the forwarding node, the path information data packet, wherein the path information data packet comprises the constrained path and the path-ID;

determining, by the forwarding node, the next-hop node according to the constrained path, wherein the next-hop node is a next node that is on the constrained path and that is relative to the forwarding node;

determining, by the forwarding node, the target interface according to the next-hop node;

selecting, by the forwarding node, the target label/target address from the label block/address block according to the path-ID and according to the preset rule; and storing, by the forwarding node, the target label/target address and the target interface in a manner relating the target label/target address and the target interface.

4. The method according to claim 3, wherein the storing the target label/target address and the target interface in a manner relating the target label/target address and the target interface comprises:

storing, by the forwarding node, the target label and the target interface in a target entry of a label forwarding information base (LFIB) in a manner relating the target label and the target interface, wherein the target label is stored in an incoming label of the target entry, and the target interface is stored in an outbound interface of the target entry.

5. The method according to claim 4, wherein the determining the target interface according to the next-hop node comprises:

determining, by the forwarding node, that the next-hop node is a neighbor node of the forwarding node;

determining, by the forwarding node, an interface corresponding to the next-hop node as the target interface; and storing, by the forwarding node, the path-ID in an outgoing label of the target entry.

6. The method according to claim 4, wherein the determining the target interface according to the next-hop node comprises:

determining, by the forwarding node, that the next-hop node is not a neighbor node of the forwarding node;

selecting, by the forwarding node, the target interface from an interface other than an interface through which the data packet is received; and storing, by the forwarding node, an identifier of the next-hop node in an outgoing label of the target entry.

7. The method according to claim 3, wherein the storing the target label/target address and the target interface in a manner relating the target label/target address and the target interface comprises:

storing, by the forwarding node, the target address and the target interface in a target entry of a forwarding information base (FIB) in a manner relating the target address and the target interface, wherein the target label is stored in an address of the target entry, and wherein the target interface is stored in an interface of the target entry.

8. The method according to claim 7, wherein the determining the target interface according to the next-hop node comprises:

determining, by the forwarding node, that the next-hop node is a neighbor node of the forwarding node; and determining, by the forwarding node, an interface corresponding to the next-hop node as the target interface.

9. The method according to claim 7, wherein the determining the target interface according to the next-hop node comprises:

determining, by the forwarding node, that the next-hop node is not a neighbor node of the forwarding node;

selecting, by the forwarding node, the target interface from an interface other than an interface through which the data packet is received; and storing, by the forwarding node, an address of the next-hop node in the address of the target entry.

10. A data transmission method, comprising:

receiving, by a source node, a data packet;

determining, by the source node, a target customer edge (CE) according to a destination internet protocol (IP) address of the data packet;

determining, by the source node, a path identifier (path-ID) and a corresponding next- hop node according to the target CE, wherein the path-ID is an identifier of a constrained path and identifies the constrained path while avoiding identifying, in the path-ID, nodes forming the constrained path, wherein the constrained path is a path that consists of at least two nodes arranged in a specific order, wherein the next-hop node is a next node that is on the constrained path and that is relative to the source node, wherein the target node is a last node on the constrained path, wherein at least a first value of a first local available label block/address is different from at a second value of a second local available label block/address, wherein the first local available label block/address is a local available label block/address at a location, of a local available label block/address block at a first node on the constrained path, that is associated with the path-ID and a preset rule, and wherein the second local available label block/address is a local available label block/address at a location, of a local available label block/address block at a second node on the constrained path, that is associated with the path-ID and the preset rule;

pushing, by the source node, the path-ID into a label stack of the data packet;

pushing, by the source node, in response to the next-hop node not being a neighbor node of the source node, an identifier of the next-hop node into the label stack of the data packet;

maintaining, by the source node, in response to the next-hop node being a neighbor node of the source node, the label stack of the data packet without an identifier of the next-hop node; and sending, by the source node, the data packet to the next-hop node.

11. The method according to claim 10, further comprising performing, before the source node determines the path-ID and the corresponding next-hop node:

receiving, by the source node, a path information data packet, wherein the path information data packet comprises the constrained path and the path-ID;

determining, by the source node, the target node according to the constrained path;

determining, by the source node, the target CE according to the target node; and storing, by the source node, the target CE, the next-hop node, and the path-ID in a manner relating the target CE, the next-hop node, and the path-ID.

12. A forwarding node, comprising:

a transceiver;

a processor; and a non-transitory computer-readable storage medium storing a program to be executed by the processor, the program including instructions for:

receiving a data packet, wherein a label stack of the data packet comprises a path identifier path-ID, the path-ID is an identifier of a constrained path, and the constrained path is a path that consists of at least two nodes arranged in a specific order, and wherein the path-ID identifies the constrained path while avoiding identifying, in the path-ID, nodes forming the constrained path;

selecting a target label/target address from a local available label block/address block based on the path-ID and according to a preset rule, wherein the target label/target address has a value different from a value of at least one other local available label block/address block that is located, at a location in another node on the constrained path, wherein the location is a location in a local available label block/address block that is of the another node and is associated with the path-ID and the preset rule, wherein the label block/address block comprises at least one label/address, and wherein the target label/target address is a multi-protocol label switching (MPLS) label that is determined by the forwarding node and that is stored at the forwarding node in response to the forwarding node receiving a path information data packet prior to receiving the data packet, that is further stored in response to the forwarding node determining that the forwarding node is a node on the constrained path, and that is associated with the path ID and a corresponding target interface;

searching for the corresponding target interface based on the target label/target address;

pushing, in response to a next-hop node not being a neighbor node of the forwarding node, an identifier of the next-hop node into the label stack of the data packet;

maintaining, in response to the next-hop node being a neighbor node of the forwarding node, the label stack of the data packet without an identifier of the next-hop node; and forwarding the data packet through the target interface.

13. The forwarding node according to claim 12, wherein the preset rule comprises selecting, as the target label/target address, an $X^{th}$ label/address from the label block/address block in a preset order using a value of the path-ID as an offset X, wherein the preset order is an order of label/address values arranged in ascending order.

14. The forwarding node according to claim 12, wherein the instructions for storing the target label/target address and the target interface in a manner relating the target label/target address and the target interface include instructions for:

storing the target label and the target interface in a target entry of a label forwarding information base (LFIB) in a manner relating the target label and the target interface, wherein the target label is stored in an incoming label of the target entry, and the target interface is stored in an outbound interface of the target entry.

15. The forwarding node according to claim 12, wherein the program further includes instructions for:

receiving the path information data packet, wherein the path information data packet comprises the constrained path and the path-ID;

determining the next-hop node according to the constrained path, wherein the next-hop node is a next node that is on the constrained path and that is relative to the forwarding node;

determining the target interface according to the next-hop node;

selecting the target label/target address from the label block/address block according to the path-ID and according to the preset rule; and storing the target label/target address and the target interface in a manner relating the store the target label/target address and the target interface.

16. The forwarding node according to claim 15, wherein the instructions storing the target label/target address and the target interface in a manner relating the target label/target address and the target interface include instructions for:

storing the target address and the target interface in a target entry of a forwarding information base (FIB) in a corresponding manner, wherein the target label is stored in an address of the target entry, and the target interface is stored in an interface of the target entry.

17. The forwarding node according to claim 16, wherein the instructions for determining the target interface based on the next-hop node include instructions for:

determining that the next-hop node is not a neighbor node of the forwarding node;

selecting the target interface from an interface other than an interface through which the data packet is received; and storing an identifier of the next-hop node in an outgoing label of the target entry.

18. The forwarding node according to claim 16, wherein the instructions for determining the target interface according to the next-hop node include instructions for:

determining that the next-hop node is a neighbor node of the forwarding node;

determining an interface corresponding to the next-hop node as the target interface; and storing the path-ID in an outgoing label of the target entry.

19. The forwarding node according to claim 18, wherein the instructions for determining the target interface based on the next-hop node include instructions for:

determining that the next-hop node is a neighbor node of the forwarding node; and determining an interface corresponding to the next-hop node as the target interface.

20. The forwarding node according to claim 18, wherein the instructions for determining the target interface based on the next-hop node include instructions for:
   determining that the next-hop node is not a neighbor node of the forwarding node;
   selecting the target interface from an interface other than an interface through which the data packet is received; and
   storing an address of the next-hop node in the address of the target entry.

\* \* \* \* \*